United States Patent [19]

Amaratunga et al.

[11] Patent Number: 5,852,681
[45] Date of Patent: Dec. 22, 1998

[54] METHOD AND APPARATUS FOR ELIMINATING ARTIFACTS IN DATA PROCESSING AND COMPRESSION SYSTEMS

[75] Inventors: Kevin Amaratunga, Cambridge; John R. Williams, Concord, both of Mass.

[73] Assignee: Massachusetts Institute of Technology, Cambridge, Mass.

[21] Appl. No.: 425,759

[22] Filed: Apr. 20, 1995

[51] Int. Cl.$^6$ .................................................. G06K 9/40
[52] U.S. Cl. ........................................ 382/268; 382/254
[58] Field of Search ................................. 382/254, 256, 382/266, 268, 269

[56] References Cited

U.S. PATENT DOCUMENTS

| | | | |
|---|---|---|---|
| 5,014,134 | 5/1991 | Lawton et al. | 358/261.3 |
| 5,046,504 | 9/1991 | Albert et al. | 128/696 |
| 5,101,446 | 3/1992 | Resnikoff et al. | 382/56 |
| 5,297,033 | 3/1994 | Bito et al. | 364/413.2 |
| 5,321,776 | 6/1994 | Shapiro | 382/56 |
| 5,331,414 | 7/1994 | Golin | 348/390 |
| 5,384,725 | 1/1995 | Coifman et al. | 364/807 |
| 5,422,963 | 6/1995 | Chen et al. | 382/232 |
| 5,537,494 | 7/1996 | Toh | 382/242 |

FOREIGN PATENT DOCUMENTS

| | | | |
|---|---|---|---|
| 561593A2 | 9/1993 | European Pat. Off. . | |
| 0584676 A1 | 3/1994 | European Pat. Off. | H01L 21/66 |
| 611051A1 | 8/1994 | European Pat. Off. . | |
| 0658751 A2 | 6/1995 | European Pat. Off. | G01J 3/28 |
| 9417492 | 8/1994 | WIPO . | |
| 9423385 | 10/1994 | WIPO . | |

OTHER PUBLICATIONS

R. Parker, "An Algorithm for High Order Polynomial Extrapolation," *International J. for Numerical Methods in Engineering*, 14(9):1428–1429 (1979).

R.T. Constable and R.M. Henkelman, "Data Extrapolation for Truncation Artifact Removal," *Magnetic Resonance in Medicine*, 17(1) (Jan. 1991).

Hamza et al., "Polynomial Extrapolation in Sampled–Data Control Systems," *IEEE Transactions on Automatic Control*, AC–16(1):102–103 (Feb. 1971).

Meyer et al. "L'analyse par ondelettes," *Pour la Science*, pp. 28–37 (Sep. 1987).

Hong Yan, "Data Truncation Artifact Reduction in MR Imaging Using a Multilayer Neural Network," *IEEE Transactions on Medical Imaging*, 12(1):73–77 (Mar. 1993).

Joel F. Martin and Charles F. Tirendi, "Modified Linear Prediction Modeling in Magnetic Resonance Imaging," *J. of Magnetic Resonance*, 82(2):392–399 (Apr. 1989).

K. Amaratunga et al., "Time Integration Using Wavelets" *SPIE 2491*:894–902 (1995).

"Multiresolution Analysis on Nonsmooth Sets with Applications", *SPIE* vol. 2491, by Bjorn Jawerth, et al., Jul. 1995, pp. 1056–1065.

"A Theory for Multiresolution Signal Decomposition: The Wavelet Representation", *IEEE*, vol. 11, No. 7, by S.G. Mallat, Jul. 1989, pp. 674–693.

"Orthonormal Bases of Compactly Supported Wavelets", *Communications on Pure and Applied Mathematics*, vol. XLI, No. 7, by I. Daubechies, Oct. 1988.

"A Discrete Wavelet Transform Without Edge Effects", by John R. Williams, et al., Jan. 28, 1995.

"High Order Wavelet Extrapolation Schemes for Initial Value Problems and Boundary Value Problems", by John R. Williams, et al., Jul. 25, 1994.

"Wavelets and Signal Processing", *IEEE SP Magazine*, by Olivier Rioul, et al. Oct. 1991, pp. 14–38.

Bradley et al, "Reflected Boundary Conditions . . . " May 1992 p. 307 and 308.

Kateb et al, "The Strömberg Wavelet and the Franklin System" Aug. 1993 pp. 3562–3566.

*Primary Examiner*—Leo H. Boudreau
*Assistant Examiner*—Christopher S. Kelley
*Attorney, Agent, or Firm*—Testa, Hurwitz & Thibeault, LLP

[57] ABSTRACT

A method and apparatus to eliminate artifacts in data processing and compression systems.

8 Claims, 16 Drawing Sheets

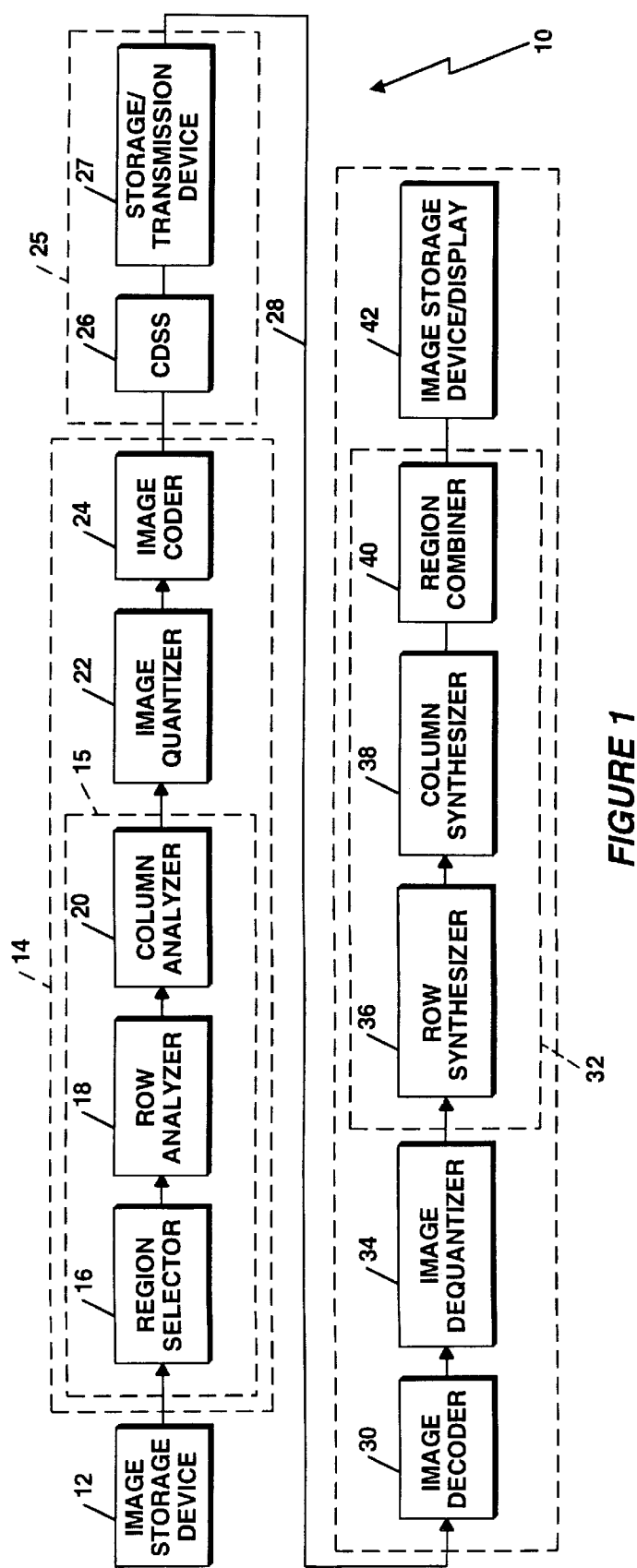

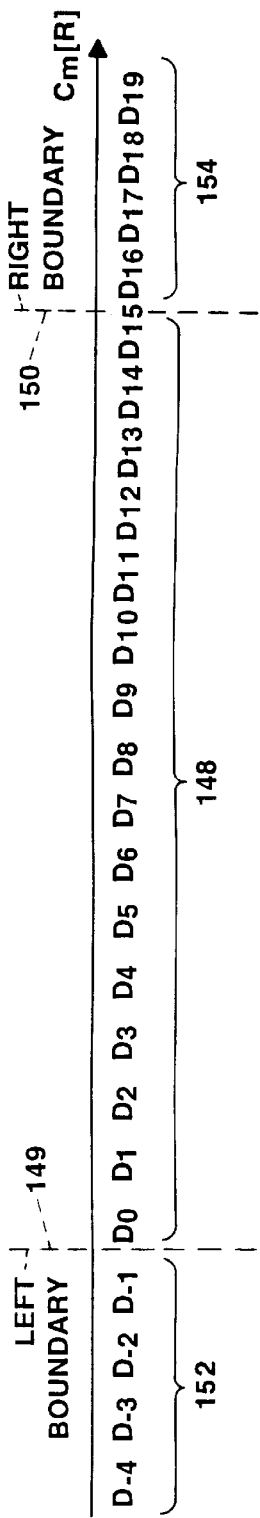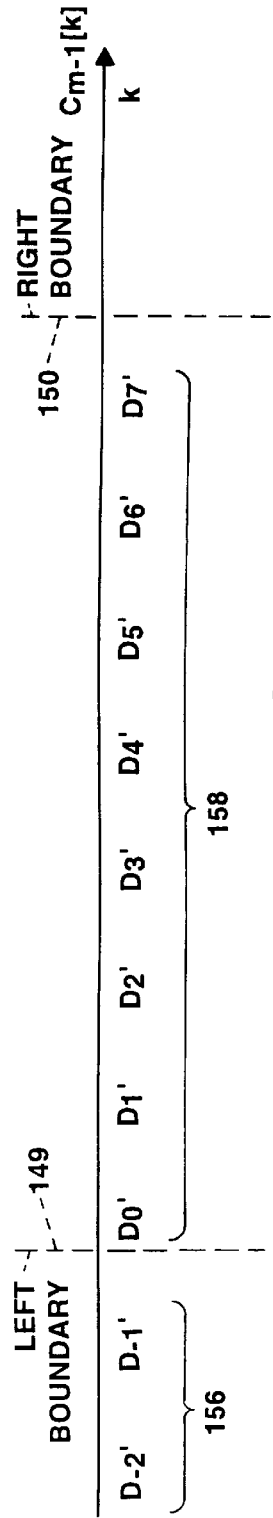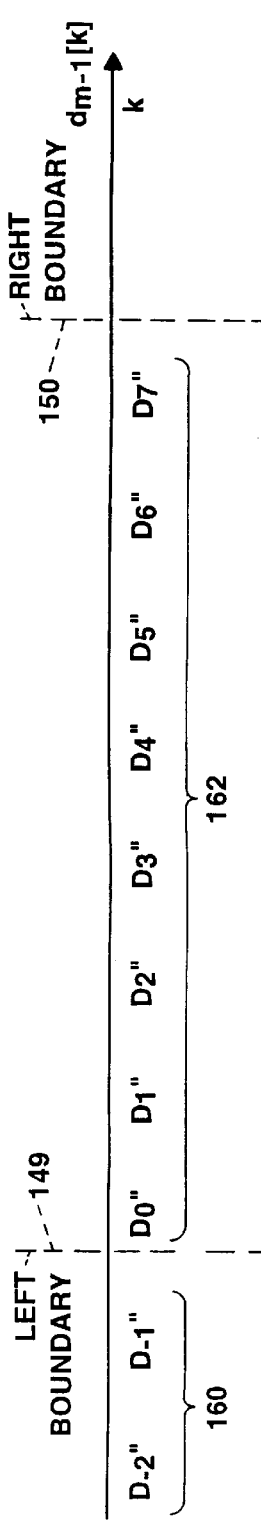

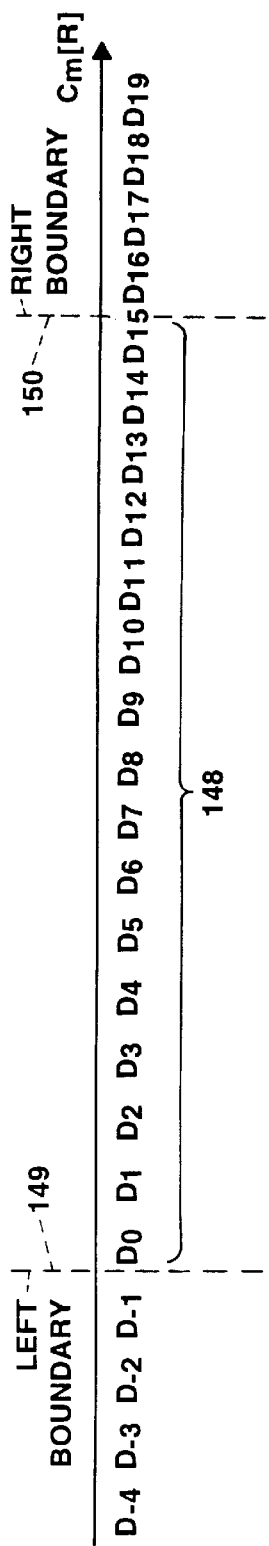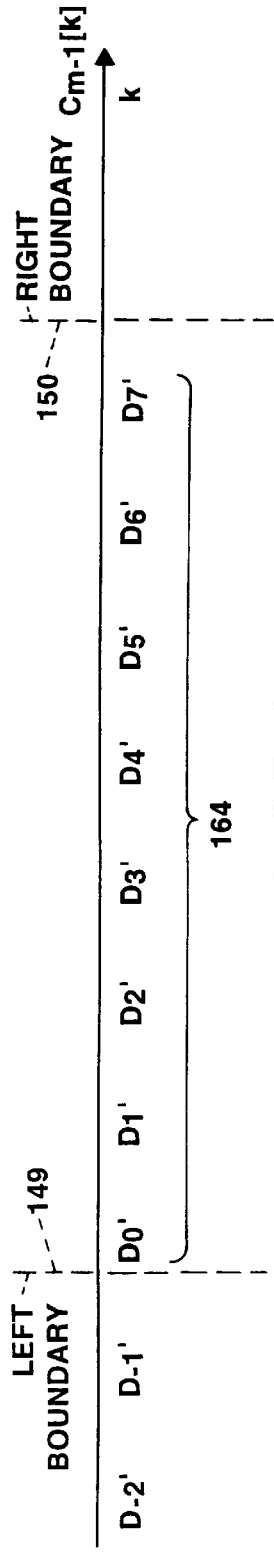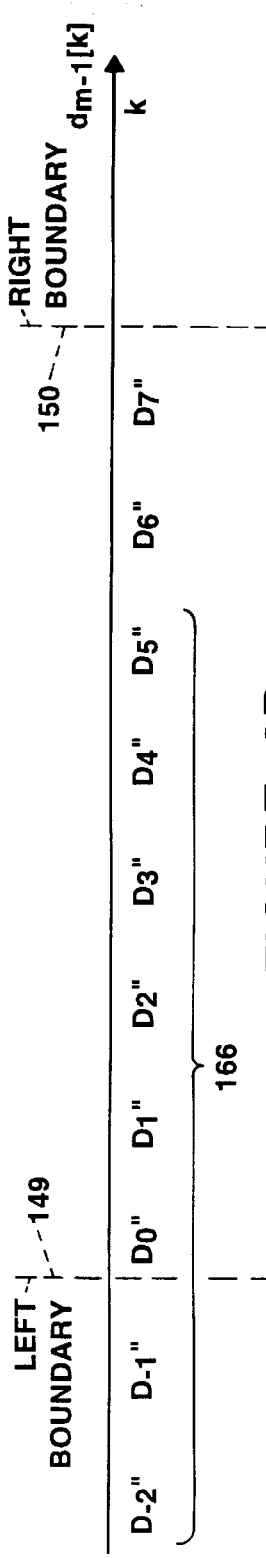

FIGURE 8C

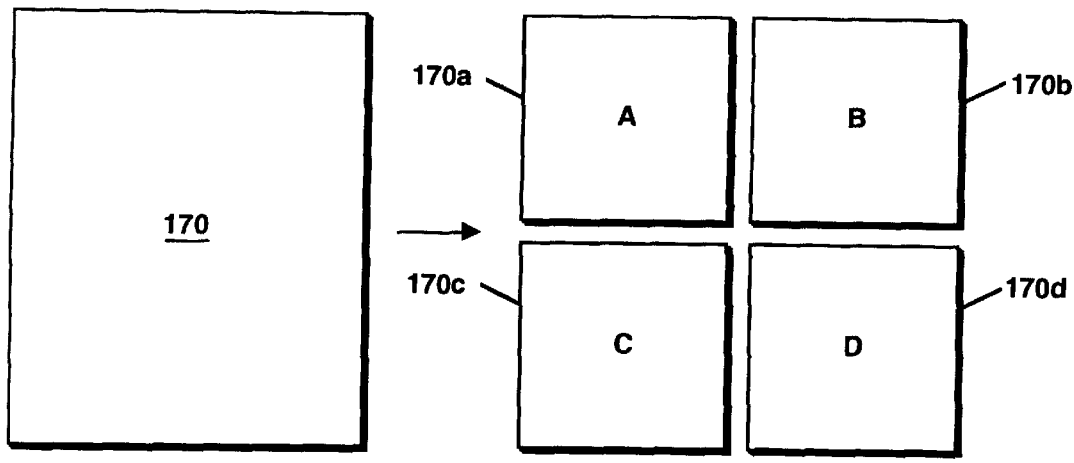
FIGURE 9
FIGURE 9A
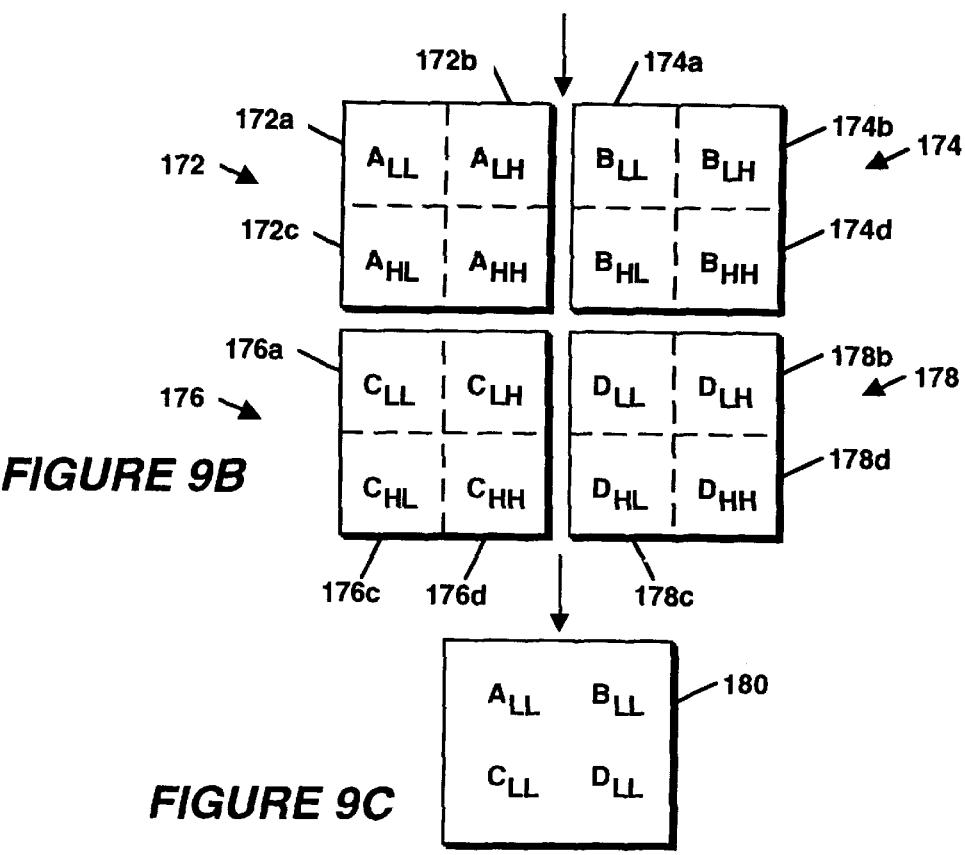
FIGURE 9B
FIGURE 9C

METHOD AND APPARATUS FOR ELIMINATING ARTIFACTS IN DATA PROCESSING AND COMPRESSION SYSTEMS

FIELD OF THE INVENTION

This invention relates to signal processing techniques and more specifically to data compression and decompression apparatus and techniques.

BACKGROUND OF THE INVENTION

As is known in the art, compression techniques are used to reduce the number of bits present in a bit sequence representative of image data.

In one compression technique, a multiresolution analysis is performed on the bit sequence using a wavelet transform, for example. Such transforms are typically implemented with a digital filter. It is implicit in such transforms that an original data sequence $c_m[n]$ is of infinite length i.e. $-\infty \leq n \leq \infty$. Practical applications, however, necessarily operate on data sequences of finite length. Thus problems arise when digital filters operate at the ends of the data sequences being transformed.

For example, when a digital filter reaches an end of a bit sequence corresponding to a boundary of an image (e.g. a right hand edge of an image) some of the filter inputs required by the filter do not exist in the bit sequence which represents the image. To transform finite length data, therefore, it is necessary to perform special operations at the ends (boundaries) of the data.

As is also known, several techniques have been developed to solve the problem of the digital filter extending beyond the boundaries of the image data being transformed. One technique generally referred to as zero padding assumes non-existent data values beyond the end of the data sequence have a value of zero. This may result in discontinuities at the boundary however, where an object in the image would otherwise have extended beyond the image boundary but where the assumed zeros cause an abrupt truncation of the object at the boundary. This results in a transformed image having an artifact at the edge of the image to which the zero value data points were added.

In another technique, generally referred to as circular convolution, the two ends of the data are joined together. This introduces a false discontinuity at the joined ends but the problem with data values extending beyond the image boundaries no longer exists. The data does not however, continue smoothly at the joined ends and thus images processed using this technique have edge effects therein.

Similarly, in another technique, the data is mirrored (or reflected) about each boundary. This technique maintains continuity of the data sequence as represented by a polynomial function, but it does not maintain continuity of the first derivative of the polynomial representative of the data sequence. Nevertheless, this technique also produces transformed images having edge effects.

It would therefore be desirable to provide a compression and decompression technique which eliminates edge effects from a transformed image and which is also relatively efficient and inexpensive to implement in hardware and/or software.

SUMMARY OF THE INVENTION

Thus, in accordance with the present invention, a signal analyzer includes an edge detector which detects a boundary of a sequence of image data and defines a boundary region and an edge matcher which matches a polynomial to image data in the boundary region. The analyzer further includes an extrapolator which extrapolates the polynomial across the boundary and an external matcher which generates external pixel values corresponding to the extrapolated polynomial. With such an arrangement, an analyzer for eliminating edge effects in an image processing system is provided. The edge detector, edge matcher, extrapolator and external pixel matcher process a data sequence fed thereto to generate an extrapolated data sequence. The extrapolated data sequence may be fed to a filter bank. With the extrapolated data sequence, the filter bank is able to decompose the original image into a plurality of data sequences which correspond to a transformed image which does not have any edge effects. The data sequences can later be reconstructed either in whole to recover the original image or in part to recover useful representations of the original image. In one embodiment, the filter may be provided as a digital filter which decomposes the extrapolated data sequence using a wavelet based multiresolution decomposition. In other embodiments, the filter may be provided as a numerical filter which operates on the extrapolated data sequence to produce, for example, a numerical derivative. Furthermore, the analyzer of the present invention allows application of a wavelet transform to image or other data having boundaries of arbitrary shape. Moreover, the analyzer of the present invention allows filtering operations (such as numerical derivatives) to be applied to data with boundaries of arbitrary shape for the purpose of numerical simulation, such as performing a digital simulation of an analog system.

In accordance with a further aspect of the present invention a method of generating an extrapolated data sequence includes the steps of receiving a data sequence, defining a first boundary region proximate a first boundary point of the data sequence, matching a polynomial to the data points in the boundary region, extrapolating the polynomial across the boundary point to a region exterior to the boundary region and generating external pixel values corresponding to the extrapolated portion of the polynomial. With this particular technique, a method of generating a data sequence which can be transformed and perfectly reconstructed without edge effects is provided. When the data sequence corresponds to a sequence of image data, a method for providing a transformed image having no edge effects is provided. The method minimizes the edge effects by extrapolating the data beyond the boundaries smoothly. The method allows application of the wavelet transform or other transforms to image or other data with boundaries having arbitrary shape.

In accordance with a further aspect of the present invention a method of eliminating redundant data in an extrapolated transformed data sequence includes the steps of selecting a predetermined number of data points in a low pass data sequence at a first scale wherein the data sequence lies within first and second boundaries defined by first and second data points in the sequence of data and selecting a predetermined number of data points in a high pass data sequence wherein at least one of the selected data points corresponds to an external data point and wherein the total number of data points selected does not exceed the total number of data points in the original data sequence. With this particular technique, a method for ensuring that a transformed data sequence having exactly the same number of data samples as an original data sequence is provided. Moreover, the method ensures that an original data sequence can be perfectly reconstructed from the transformed data sequence. The discrete transform may be provided as a discrete wavelet transform. The method includes the steps of retaining an independent set of transform samples after a discrete wavelet transform with edge correction via an extrapolation technique is applied to the original data sequence. When the extrapolated transformed data sequence represents a transformed image, a method for providing a transformed image free of edge effects and having exactly the same number of data points as the original image is provided. Furthermore, the original image can be perfectly reconstructed without edge effects from the transformed data sequence.

In accordance with a still further aspect of the present invention a data compression apparatus includes a data transform apparatus for receiving an original data sequence at an input port thereof and for providing an extrapolated data sequence at an output thereof, an image quantizer coupled to receive the extrapolated data sequence from the image transform apparatus and an image coder coupled to receive a quantized extrapolated data sequence from the data quantizer. With this particular arrangement a data compression system which provides a transformed data sequence which may be reconstructed without artifacts is provided. The image transform apparatus may further include a region selector for selecting at least a portion of a data set to be transformed and an analyzer which processes a data sequence fed thereto and which extrapolates data at first and second boundaries of the data sequence to provide an extrapolated data sequence at the output port of the data transform apparatus. The region selector may select a data set which forms an irregularly shaped data array upon which the analyzer operates.

In accordance with a further aspect of the present invention a data decompression apparatus includes a data decoder for receiving a coded data sequence and for providing a decoded data sequence to a data de-quantizer. The data de-quantizer receives a quantized data sequence at an input port thereof and provides a de-quantized data output sequence at an output port thereof to a synthesizer which performs an inverse transform on the data sequence fed thereto. The synthesizer reconstructs the data sequence and computes data sequences which are required to reconstruct representations of the original data sequence without edge effects, including perfect reconstruction of the original data sequence.

BRIEF DESCRIPTION OF THE DRAWINGS

FIG. 1 is a block diagram of an image processing system;

FIGS. 6–6B are a series of figures illustrating a one stage decomposition of an original data sequence representative of an image;

FIGS. 8–8B are a series of figures illustrating selection of particular data points for storage and for later use in reconstruction of an original data sequence;

FIG. 8C is a sixteen by sixteen discrete wavelet transform matrix generated using a Daubechies D6 filter in accordance with the present invention;

FIGS. 9–9C are a series of figures illustrating the operation of a region selector and a region combiner to provide a composite image;

DESCRIPTION OF THE PREFERRED EMBODIMENT

Terminology

Figure 1A:
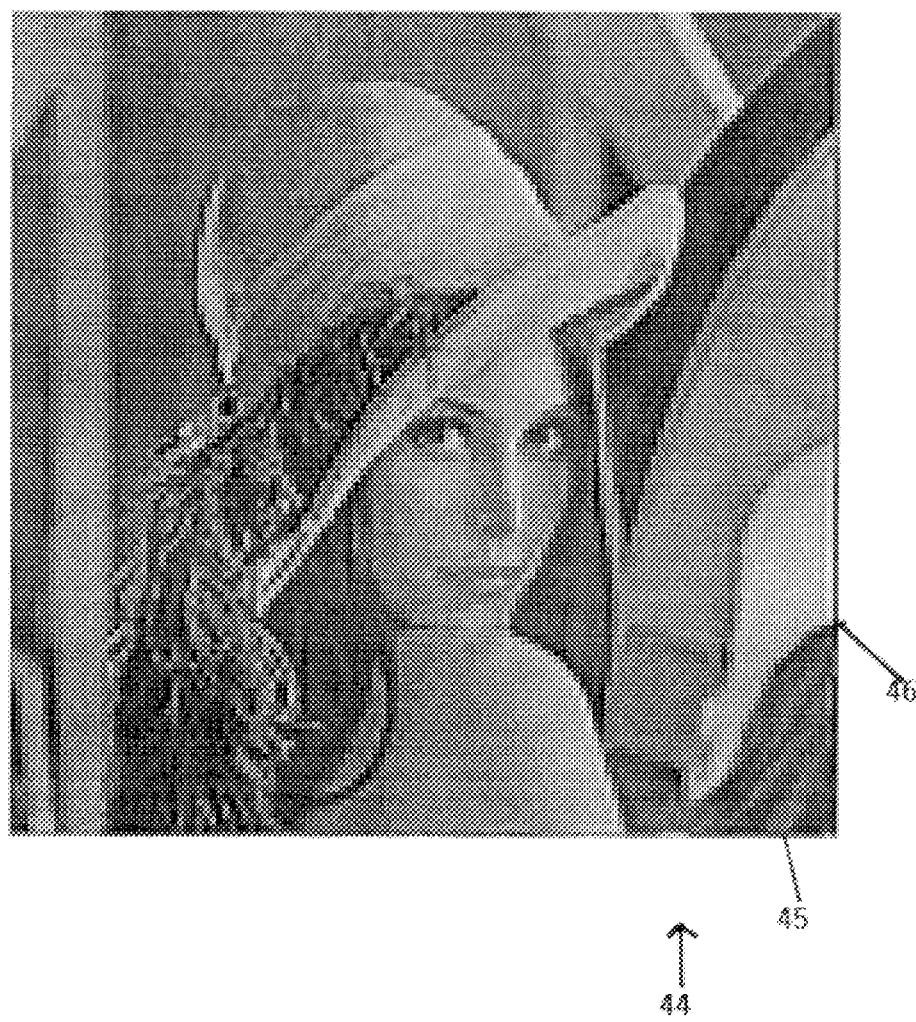
FIG. 1A is a screen print of an image transformed using a prior art technique.

Before describing the operations performed on an image to be transformed, some introductory concepts and terminology are explained.

An analog or continuous parameter image such as a still photograph may be represented in a storage device of a computer or other digital processing device as a matrix of digital data values. As described herein, the matrix of digital data values are generally referred to as a digital image or more simply an image. An image is thus stored in the digital data storage device, such as memory for example, as an array of numbers representing the spatial distribution of energy in a scene.

Each of the numbers in the array may be referred to as picture element or a pixel or as image data. Thus, a pixel represents a single sample which is located at specific spatial coordinates in the image.

The image may be divided into a two dimensional array of pixels each of the pixels represented by a digital word. The value of each digital word corresponds to the intensity of the pixel and thus the image at that particular pixel location.

An original image is one on which a transformation is to be performed. The original image is represented by an original data sequence. As described herein, reference is sometimes made to an array which holds the image and which is taken to be 512×512. One of ordinary skill in the art will of course recognize that the techniques described herein are applicable to various sizes and shapes of pixel arrays including irregularly shaped pixel arrays.

The image is provided having an image boundary or more simply a boundary. The image boundary defines outside edges of an image beyond which no image data exists. An image may be decomposed into one or more sub-band images. Each of the sub-band images may itself be treated as an image and decomposed into further sub-band images.

Furthermore a portion of an image or a sub-image may itself be selected and operated on as an image. Thus, the image portion may, for example, be decomposed into one or more sub-band images. An image portion would be provided having its own uniquely defined and generally irregularly shaped boundary.

In some cases an image will be divided into a plurality of image regions or sections referred to as image blocks. Thus in such a case an image portion is equivalent to an image block.

Referring now to FIG. 1 an image processing system 10 includes an image storage device 12 in which an image is stored as an array of pixels. The image storage device is coupled to an input port of an image compression system 14. The image compression system 14 includes an image transform apparatus 15. The image transform apparatus 15 includes a region selector 16.

Region selector 16, may for example, divide an image stored in device 12 into a plurality of image regions. The results of such an operation will be described in detail in conjunction with FIG. 9 below. Alternatively, region selector 16 may select the entire portion of the image stored in the storage device 12.

Alternatively still, region selector 16 may select an image portion having an irregular shape. For example, in a scene having a person's face with background material there behind, the face may be selected by the region selector 16 as the image on which operations are to be performed. In this case, the rows and columns of the resulting pixel array may hold a random number of image data points. Thus, each row and column of the pixel array may have a different number of elements.

Each image portion selected by region selector 16 may be operated on by a row analyzer 18 and a column analyzer 20. Thus, image selector 16 selects an array of pixels corresponding to an image and analyzers 18, 20 operate on the rows and columns of pixel data to provide a transformed image at the output port of image transformation apparatus 15.

Row analyzer 18 receives each row of data in the pixel array selected by region selector 16 in a predetermined sequence. Each row of data includes a data sequence having a left boundary point and a right boundary point. In a manner to be described in detail herein below, when processing data points which define either a left or right boundary of the image, analyzer 18 extrapolates the data past the boundary to generate a sequence of extrapolated data points which are subsequently used to generate a first sequence of transformed data points.

Similarly, column analyzer 20 receives each column of data in the row transformed pixel array. Each column of data is provided from a data sequence having a top boundary point and a bottom boundary point. In a manner to be described in detail herein below, when processing data points which define either a top or bottom boundary of the image, analyzer 20 extrapolates the data past the boundary to generate a sequence of extrapolated data points which are subsequently used to generate a second sequence of transformed data points. Those of ordinary skill in the art will recognize, of course, that the position of the row analyzer and the column analyzer can be interchanged.

The second sequence of transformed data points represents a transformed image and is provided at the output port of image transformation apparatus 15. It should be noted that image transform apparatus 15 may be implemented via a digital signal processing circuit or an application specific integrated circuit (ASIC). Alternatively, transform apparatus 15 may be implemented in a properly programmed general purpose computer or other processor.

All or some of the data points in the second sequence may be fed to an image quantizer 22 and image coder 24 which provide a compressed set of image data to a data server 25.

Data server 25 includes a compressed data selector and sequencer (CDSS) 26 and a storage/transmission device 27.

Data server 25 sequences the compressed data fed thereto in a predetermined order for storage or transmission over a data path 28. It should be noted that the compressed data provided to data server 25 may be stored or transmitted in its entirety or alternatively selected portions of the compressed data may be stored or transmitted by data server 25.

All or part of the data sequence provided by compression system 14 and the data server 25 over path 28 may be received by a decompression system 29 which includes an image decoder 30, an image de-quantizer 34 and an image transformation apparatus 32 which includes a row synthesizer 26, a column synthesizer 38 and a region combiner 40. Image transformation apparatus 32 transforms data fed thereto using a transform which is the inverse of that performed by apparatus 15 to provide a reconstructed image at an output port thereof.

As noted above, image transform apparatus 15 may in some applications provide at its output port less than the entire data sequences which resulted after the extrapolation process performed by row and column analyzers 18, 20. In this case, row and column synthesizers 36, 38 will generate data points which were not transmitted by compression system 14 but which are needed to exactly reconstruct a data sequence corresponding to the portion of the uncompressed image selected by region selector 16 and transmitted by data server 25. One method of recovering and reconstructing data will be described in detail below in conjunction with FIGS. 8–8B.

Similarly, in those cases where region selector 16 divided the image into a plurality of images or blocks, region combiner 40 will combine the data sequences provided thereto from synthesizers 36, 38 to provided a composite image at an output port of the decompression system 28. The decompressed data may then be fed to a device 42 which may for example correspond to an image storage device such as a CDROM, a memory of a processing system or a display.

It should also be noted that in some applications, the data server 25 may elect to store or transmit less than the entire data resulting from the compression. Similarly, transform apparatus 32 may elect to receive less than all of the data provided by compression system 14.

Referring now to FIG. 1A a transformed image 44 transformed using prior art techniques and thus having edge effects 45, 46 along right and bottom boundaries thereof, respectively, is shown. The original image was provided from an image array of 512×512 pixels. To provide image 44, a two stage decomposition was performed on an original image (not shown) and image 44 corresponds to an average block of 128×128 pixels. A ten tap Daubechies filter (D10) was used in the decomposition and a circular convolution (i.e. wrap around) technique was used at the left and right hand and the top and bottom edges of the image. Image 44 thus corresponds to an average sub-band image generated from the output data sequence of the low pass filter portion of the D10 filter.

It should be noted that if a mirroring technique or any other conventional technique had been used, edge effects similar to edge effects 45, 46 would still be present in image 44.

Figure 1B:
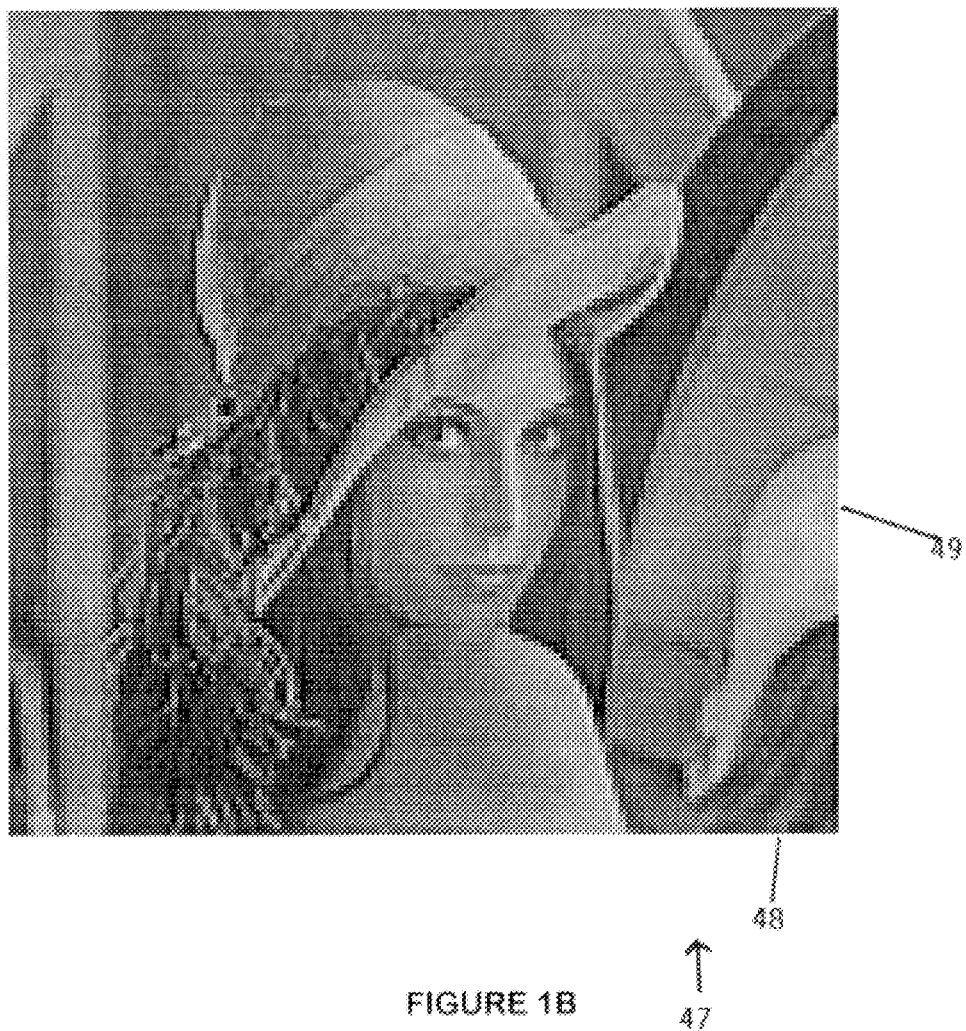
FIG. 1B is a screen print of an image transformed in accordance with the present invention.

Referring now to FIG. 1B, an image 47 transformed in accordance with the present invention has no edge effects. As can be clearly seen in FIG. 1B edges 48, 49 do not exhibit any edge effects resultant from transformation of the finite data set which represents image 47.

The parameters used to generate the image 47 were the same as those used to provide image 44 (FIG. 1A) except that an extrapolation technique was used at the boundary points of the image data which was decomposed to provide image 47.

It should be noted that the extrapolation technique of the present invention could have been used on the rows of the pixel array corresponding to the original image and a circular convolution or some other technique could have been used on the columns of the pixel array in which case an image having no edge effects on the right hand boundary thereof but having edge effects on the bottom boundary thereof would be provided.

Figure 2:
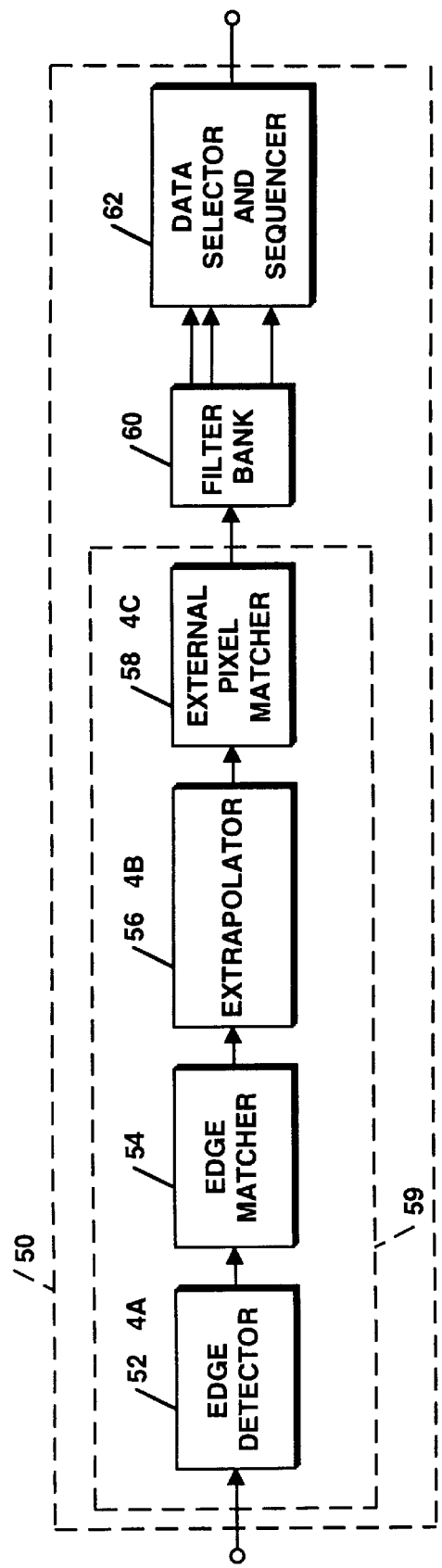
FIG. 2 is a block diagram of a signal analyzer.

Referring now to FIG. 2, an analyzer 50 which may be similar to row analyzer 18 or column analyzer 20 described above in conjunction with FIG. 1, includes an edge detector 52 which determines when a boundary region of a data sequence is reached. The boundary region corresponds to a region proximate a boundary of an image. The edge detector 52 is coupled to an edge matcher 54 which matches a polynomial of a predetermined order to a predetermined number of data points in the boundary region selected by edge detector 52.

In some embodiments, edge matcher 54 provides the polynomial of predetermined order as a best fit polynomial to data points which exist in the boundary region selected by edge detector 52. Edge matcher 54 is coupled to an extrapolator 56 which extrapolates the polynomial across the boundary by a predetermined distance into a region exterior to the image. After the polynomial has been extrapolated into the exterior region of the image, an external pixel matcher 58 generates from the extrapolated portion of the polynomial a predetermined number of external pixel values.

Edge detector 52, edge matcher 54, extrapolator 56 and external pixel matcher 58 form a pre-processing circuit 59 which generates a data sequence which includes external or extrapolated pixels. The data sequence including the external pixel values are fed to a filter bank 60 to provide a data sequence at the output ports thereof to a data selector and sequencer 62. The data sequencer and selector 62 selects a predetermined number of pixel values to provide a transformed data sequence and provides the data sequence at an output port of analyzer 50.

Figure 3:
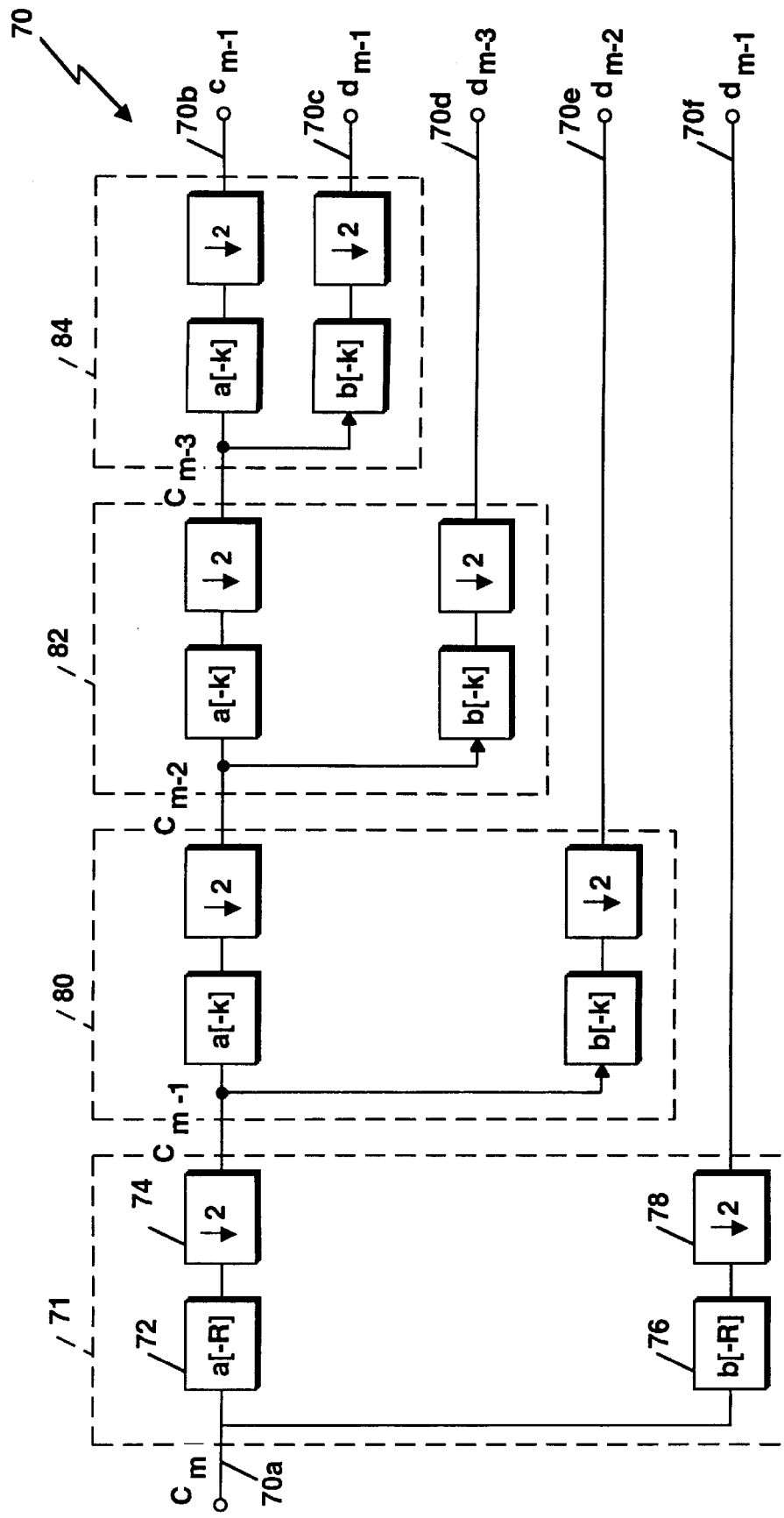
FIG. 3 is a block diagram of a four stage decomposition filter.

Referring now to FIG. 3, an analyzer 70 which may be similar to analyzer 50 described in conjunction with FIG. 2 having four stages 71, 80, 82 and 84 coupled as shown performs a four stage decomposition on an original image data sequence $c_m$ fed to an input port 70a. Taking filter stage 71 as representative of filter stages 80, 82 and 84, filter stage 71 includes filter coefficients 72, 76 and down samplers 74, 78. Thus, analyzer 70 receives a bit sequence $c_m$ at input port 70a and provides a series of output bit sequences $c_{m-4}$, $d_{m-4}$, $d_{m-3}$, and $d_{m-2}$ and $d_{m-1}$ at output ports 70b–70f respectively.

It should be noted that each of the analyzers 71, 80, 82, 84 could be provided having two or more filters of any length. Thus, although each of the analyzers 18, 20 described above in conjunction with FIG. 1 represent a single stage decomposition, it is recognized that the output of column analyzer 20 could be fed back into the input of row analyzer 18 two, three or R times to thus provide a two, three or R stage decomposition.

Figure 4:
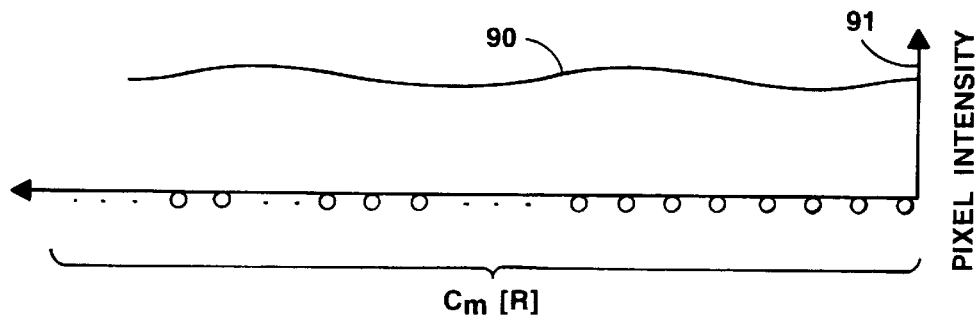
FIGS. 4–4B are a series of figures illustrating an extrapolation at a right hand boundary of an image to be transformed.
Figure 4A:
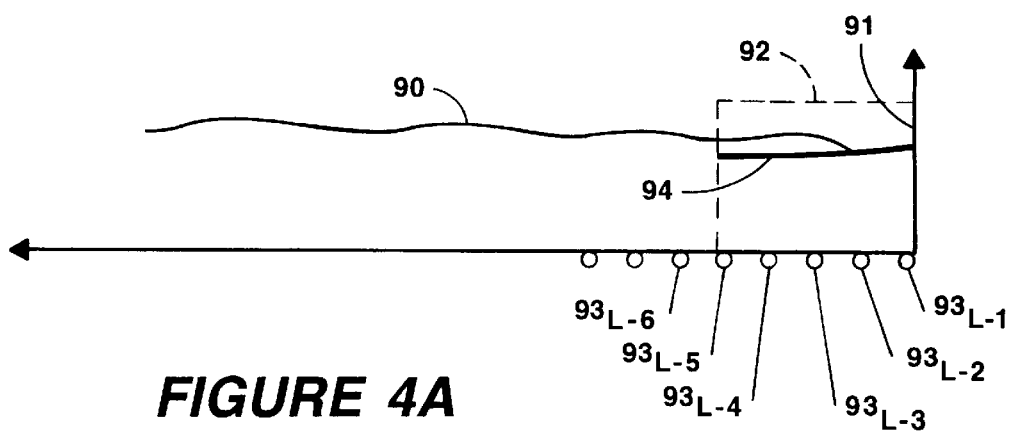
Figure 4B:
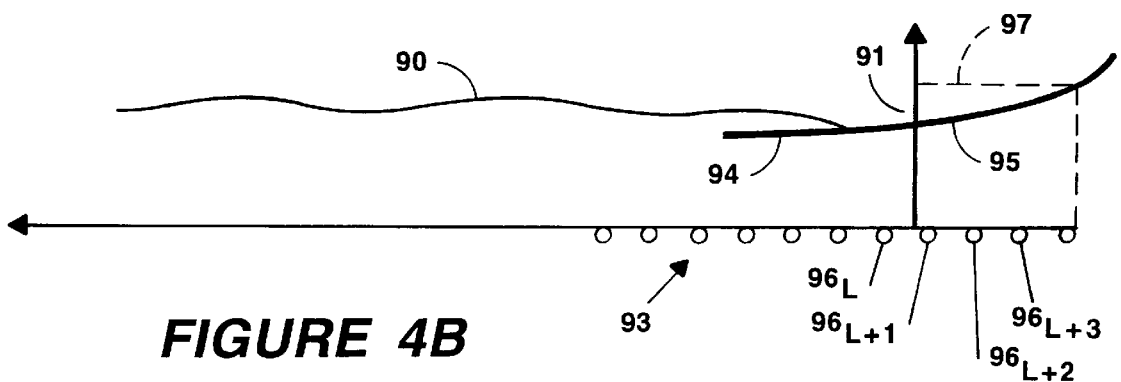

Referring now to FIGS. 4–4B in which like elements are provided having like reference designations, a continuous function representation 90 of an original discrete data sequence $c_m[k]$ is shown terminated at a right hand boundary 91 of an image. It should be noted that function 90 need not and generally will not be a polynomial.

A boundary region 92 of the image is defined, for example, by edge detector 52 (FIG. 2) and includes in this particular example six image data points or pixels $93_{L-1}$ through $93_{L-6}$ generally referred to as internal image data points or internal pixels and generally denoted 93. The minimum number of data points which should be included in the boundary region 92 will be determined by the length and characteristics of a filter used in an analyzer. A polynomial 94 is matched to the interior pixels 93 and in a preferred embodiment the polynomial 94 corresponds to a best fit polynomial to the continuous function representation of the internal image data points 93.

As shown in FIG. 4B, the polynomial 94 is extrapolated, by extrapolator 56 (FIG. 2) for example, through the boundary 91 to thus provide an extrapolated polynomial 95. Extrapolated polynomial 95 represents pixels $96_L$ through $96_{L+3}$ which are exterior to the image and thus which exist in a so-called exterior boundary region 97 of the image.

It should be noted that, a polynomial of lower order than that which the filter is able to represent could be used to extrapolate past the boundary 91. That is, a D10 filter could be used in the region preceding and into boundary region 92 and polynomial 94 used to represent pixels 93 could be selected having a relatively low order. That is, polynomial 94 could be provided having an order which is less than the highest order polynomial which could be represented by a D10 filter.

After the external pixel values 96 are computed, the external pixel values can be represented in terms of the internal pixel values 93.

As is known, a Daubechies' filter having length N may represent a polynomial of order (N/2)−1. For example, a Daubechies filter of length six (i.e. a D6 filter) may represent a quadratic (i.e. second order) polynomial. Similarly, a Daubechies filter of length ten (i.e. a D10 filter) may represent a fourth order polynomial. Since a filter of length ten provides better compression than a filter of length six, it may in some cases be desirable to use a filter having relatively long length.

It may be desirable to use a lower order filter when processing data points in the boundary region 92 to later reduce the amount of quantization error which occurs. Specifically, such an approach reduces the sensitivity of a reconstruction operation to quantization error which results during the quantization process.

As will become more evident after a discussion of the reconstruction process in conjunction with FIGS. 8–8C below, since some data values may not be stored and thus must be recovered from data values which are stored, quantization error in the data values which are stored results in computation error during recovery of data values which are not stored and which are needed to perfectly reconstruct the original data sequence and thus the original image.

Figure 5:
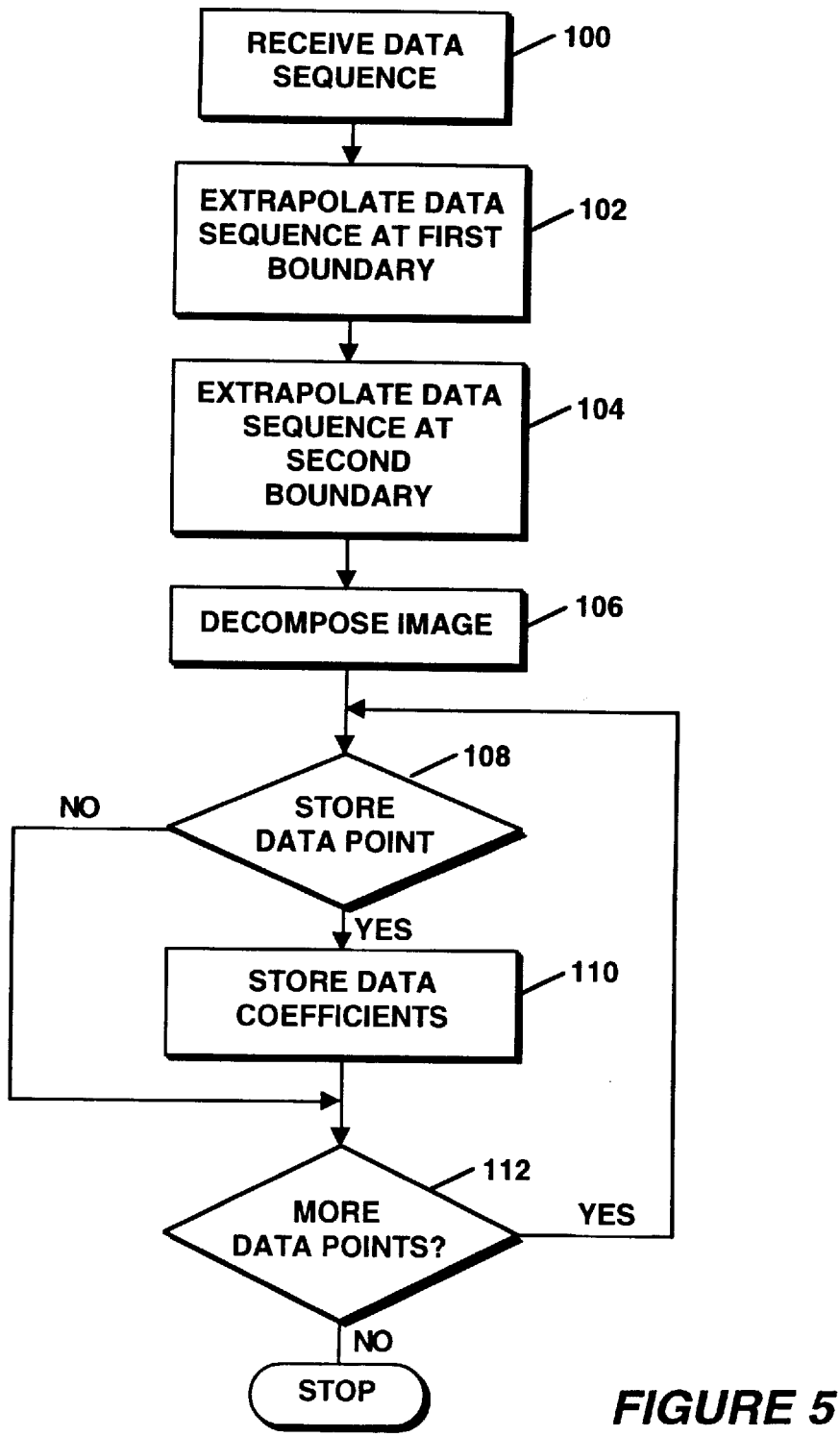
FIG. 5 is a flow diagram of the processing performed by the image processing system of FIG. 1 to decompose an image without edge effects.
Figure 5A:
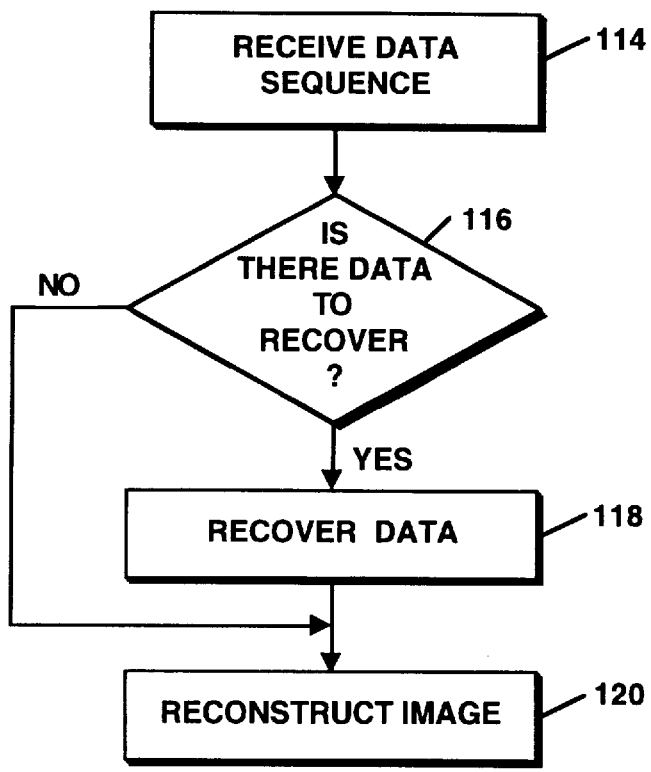
FIG. 5A is a flow diagram of the processing performed by the image processing system of FIG. 1 to exactly reconstruct an image without edge effects.

FIGS. 5 and 5A are flow diagrams showing the processing performed in transform apparatus 15, 32 to produce a transformed data image and a reconstructed data image respectively. The rectangular elements (typified by element 100) herein denoted "processing blocks" represent computer software instructions or groups of instructions or alternatively the processing blocks represent steps performed by functionally equivalent circuits such as a digital signal processor circuit or an application specific integrated circuit (ASIC). The diamond shaped elements (typified by element 108) herein denoted "decision blocks" represent instructions or groups of instructions which affect the execution of the processing blocks. The flow diagram does not depict syntax or any particular computer programming language. Rather, the flow diagram illustrates the functional information one skilled in the art requires to fabricate circuits or to generate computer software to perform the processing required of processing system 10. It should be noted that many routine program elements such as initialization of loops and variables and the use of temporary variables are not shown.

Turning now to FIG. 5, as shown in processing block 100 a data sequence is received. The data sequence represents an image which as mentioned above may correspond to an entire image or any portion thereof. A first point of the data sequence defines a first boundary of the image. An ending point of the data sequence defines a second boundary of the image.

As mentioned above, an image may be represented as a two dimensional array of pixels which are stored as bit sequences in a memory of a processor. It should be noted that a transform is first done on the rows of the pixel array and a second transform is then done on the columns of the pixel array.

Thus, when receiving the data sequence in step 100, if the data sequence corresponds to a row of the pixel array then the first point of the data sequence corresponds to a first one of a left hand or right hand boundary of the image and the ending point of the data sequence corresponds to a second one of the left hand and right hand boundary of the image. Thus, in some applications the first point of the data sequence corresponds to a left hand boundary point of the image and the ending data point of the data sequence corresponds to a right hand boundary point of the image.

Similarly, if the data sequence corresponds to a column of the pixel array, then the first point of the data sequence corresponds to a first one of a top or bottom boundary of the image and the ending point of the data sequence corresponds to a second one of the top or bottom boundary of the image. Thus, in some applications the first point of the data sequence corresponds to a top boundary point of the image and the ending data point of the data sequence corresponds to a bottom boundary point of the image.

The reverse is also true. That is, in some applications it may be desirable for the first point of a row data sequence to correspond to a right hand boundary point of the image and the ending data point of the row data sequence to correspond to a left hand boundary point of the image. Likewise the first point of a column data sequence may correspond to a bottom boundary point of the image and the ending data point of the data sequence corresponds to a top boundary point of the image.

Next, as shown in processing block 102 an extrapolation operation is performed to extrapolate the data sequence from the first boundary to provide a first set of exterior data values. Similarly, in processing block 104 an extrapolation operation is performed to extrapolate the data sequence from the second boundary to provide a second set of exterior data values. Thus resulting in an extrapolated data sequence.

Then as shown in processing block 106, the entire data sequence including the external data sequence is processed to decompose the image into a plurality of sub-band images.

Such decomposition may be performed, for example, using multiresolution decomposition algorithms which are well known to those of ordinary skill in the art.

It should be noted that after steps 102, 104 and 106 the data sequence includes redundant data because of the extrapolated data points added in steps 102 and 104. In a preferred embodiment, it is desirable to not store the redundant data. Rather, it is desirable to have the same number of data points received in the original data sequence. Thus, decision blocks 108, 112 and processing block 110 implement a loop to determine which data coefficients in the data sequence resulting after the decomposition step 106 should be stored.

In decision block 108 decision is made to determine which data points in the extrapolated data sequence should be stored in a storage device such as a memory, for example. It should be noted that all or some of the data coefficients in the extrapolated data sequence may be stored. The particular manner in which such a decision is made will be described below in detail in conjunction with FIGS. 8–8B.

If decision is made that a particular point in the extrapolated data sequence should be stored then processing continues to processing block 110 where, as shown, the selected data coefficients are stored. If less than all of the data coefficients are selected in decision block 108, then those data coefficients which are stored should be selected to allow, during a reconstruction process such as that to be described below in conjunction with FIGS. 5A and 8–8B, recovery of the original data sequence received in step 100.

If in decision block 108 decision is made that a particular point in the data sequence should not be stored then processing continues to decision block 112. In decision block 112 the number of data points stored is compared with a predetermined value representative of the number of data points required to reconstruct an image. If sufficient data points are stored to allow exact recovery of the original data sequence then processing stops. Otherwise, processing returns to decision step 108 until such time a sufficient number of data points are stored.

Referring now to FIG. 5A, the steps to reconstruct an image are shown to include receiving a data sequence 114 which has undergone a transformation process similar to that described in conjunction with FIG. 5. Such a data sequence is fed to a processing circuit which may be similar to transform circuit 32 (FIG. 1).

Next, as shown in decision step 116, if there is data to recover, processing continues to processing block 118. One technique for recovering data will be described in detail below in conjunction with FIGS. 8–8B. If there is no data to recover, then processing continues to processing block 120 and the image is reconstructed. The image is reconstructed by performing a transform which is the inverse of that performed in the decomposition step 106 described above in conjunction with FIG. 5.

It should be noted, and as will be described in detail in conjunction with FIG. 8 below, the data which is recovered is all data that is needed to exactly reconstruct the original data sequence.

For purposes of illustration the process is described for the specific case of a Daubechies' D6 filter. Those of ordinary skill in the art will recognize that other filters including but not limited to Daubechies filters of different order and biorthogonal filters may be used in conjunction with the techniques described herein. It should also be appreciated that although the data sequence $D_0$–$D_{15}$ is here taken to be one row of a pixel array which represents an image, the data sequence $D_0$–$D_{15}$ could also correspond to one row of any data array which may represent something other than an image. For example, the data array could represent an analog system to be modeled via digital techniques.

Referring now to FIGS. 6–6B, an original data sequence $D_0$–$D_{15}$ generally denoted 148 corresponds to one row of a pixel array which represents an image. A first data point Do in sequence 148 corresponds to an end point at a first boundary 149 of the image. A last data point $D_{15}$ in sequence 148 corresponds to a data point at a second boundary 150 of the image.

During an extrapolation process which occurs at the left boundary 149 of the original image data sequence $D_0$–$D_{15}$ a plurality, here four, exterior pixels $D_{-1}$, $D_{-2}$, $D_{-3}$, $D_{-4}$ generally denoted 152, are generated. As will be described in detail further below, the exterior pixel points allow for reconstruction of the original data.

Similarly a plurality, here four, exterior pixel values $D_{16}$, $D_{17}$, $D_{18}$, $D_{19}$ generally denoted 154, are generated at a right hand boundary of the image. Exterior data points 154 at the right hand boundary 150 are required to allow decomposition of the image using digital filters. In implementing the above technique in a digital computer, the external data points 152, 154 may be stored in memory locations which are either contiguous to the memory locations which hold the original data sequence 150 or alternatively data points 152, 154 may be stored in separate memory locations which are not contiguous with the memory locations in which the original data sequence 150 is stored.

Once the exterior pixels 152, 154 are generated, an extended data sequence $D_{-4}$ to $D_{19}$ results. During a decomposition operation, the data points $D_{16}$–$D_{19}$ corresponding to the exterior pixel points 154 are required to allow decomposition of the image.

It should be noted that the number of exterior pixel points 152, 154 are selected in accordance with the filter length. Specifically, given a filter of length N, the minimum number of exterior data points 152 required at boundary 149 corresponds to N–2. Similarly, for the filter of length N, the minimum number of exterior data points 154 required at boundary 150 corresponds to N–2.

As mentioned above, the exterior pixels 154 at the right hand boundary 150 of the image are required only to perform decomposition of the image. The exterior pixel values 152 at the left hand boundary 149 of the data sequence however, are required for reconstruction of the image. When the extrapolated data sequence $D_{-4}$ to $D_{19}$ is fed though a single stage analyzer, the analyzer provides low pass and high pass data sequences $c_{m-1}[k]$ and $d_{m-1}[k]$ having data points $D'_{-2}$ to $D'_7$ and $D''_{-4}$ to $D''_7$ respectively as shown in FIGS. 6A, 6B.

Low pass data sequence $c_{m-1}[k]$ includes external data points $D'_{-2}$ and $D'_{-1}$ generally denoted 156 and internal data points $D'_0$ to $D'_7$ generally denoted 158. It should be noted that since none of the external data points 154 are required to reconstruct the original data sequence 148, no corresponding data points were computed in the low pass sequence $cm_{m-1}[k]$ outside boundary 150.

Similarly, high pass data sequence $d_{m-1}[k]$ includes external data points $D''_{-2}$ and $D''_{-1}$ generally denoted 160 and internal data points $D''_0$ to $D''_7$ generally denoted 162. It should be noted that since none of the external data points 154 are required to reconstruct the original data sequence 148, no corresponding data points were computed outside boundary 150 in the high pass data sequence $d_{m-1}[k]$.

Due to the inclusion of the four exterior pixel values 156, 160, the low and high pass data sequences $c_{m-1}[k]$, $d_{m-1}[k]$ may be combined to perfectly reconstruct the original image data. The original data sequence $D_0$–$D_{15}$ may thus be recovered during a reconstruction operation.

One problem which arises, however, is that the original data sequence 148 included only sixteen data points $D_0$–$D_{15}$ while the total number of data points included in the high pass and low pass data sequences $c_{m-1}[k]$, $d_{m-1}[k]$ corresponds to twenty data points due to the inclusion of the four exterior data points 156, 160. It would therefore be desirable to reduce the number of data points in the low and high pass data sequences such that the total number of points in the combined data sequences corresponds to the total number of data points of the original data sequence.

Thus in this particular example, it would be desirable to select a first predetermined number of data points from the low pass data sequence $c_{m-1}[k]$ and a second predetermined number of data points from the high pass data sequence $d_{m-1}[k]$ to arrive at a total of sixteen data points.

In the present embodiment, it is preferred to select an equal number of data points, here eight, from each of the low pass and high pass sequences $c_{m-1}[k]$, $d_{m-1}[k]$.

Whether or not an equal number of data points are selected for each sequence, however, the sixteen data points must be selected to allow perfect reconstruction of the original data sequence. Thus, the data points must be independent of each other. The data points should be chosen so that the condition number of the resulting Discrete Wavelet Transform matrix is small. One method of selecting the data points will be described below in conjunction with FIGS. 8–8B.

It should be noted that although the the data sequence 148 was here taken to correspond to one row of a pixel array, the same principles apply to a single column of a pixel array.

Extrapolation at a Left Boundary of an Image

Figure 7:
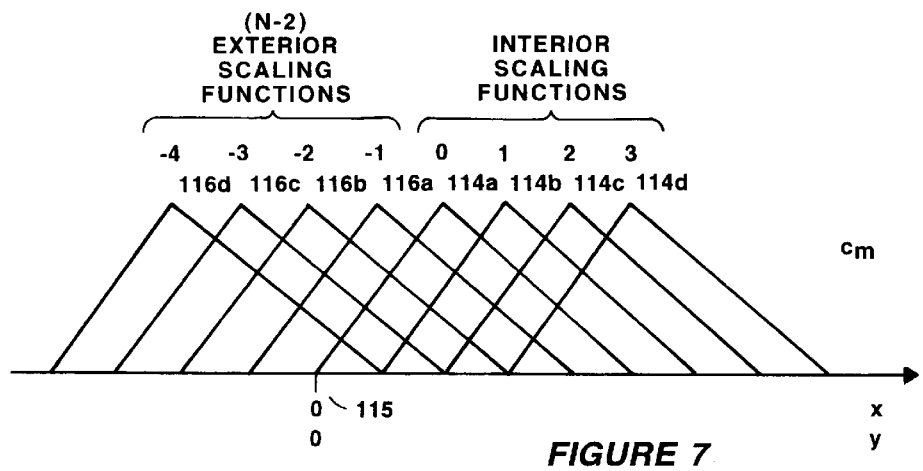
FIGS. 7–7B are a series of figures illustrating extrapolated scaling and wavelet functions at a left hand boundary of an image to be transformed.
Figure 7A:
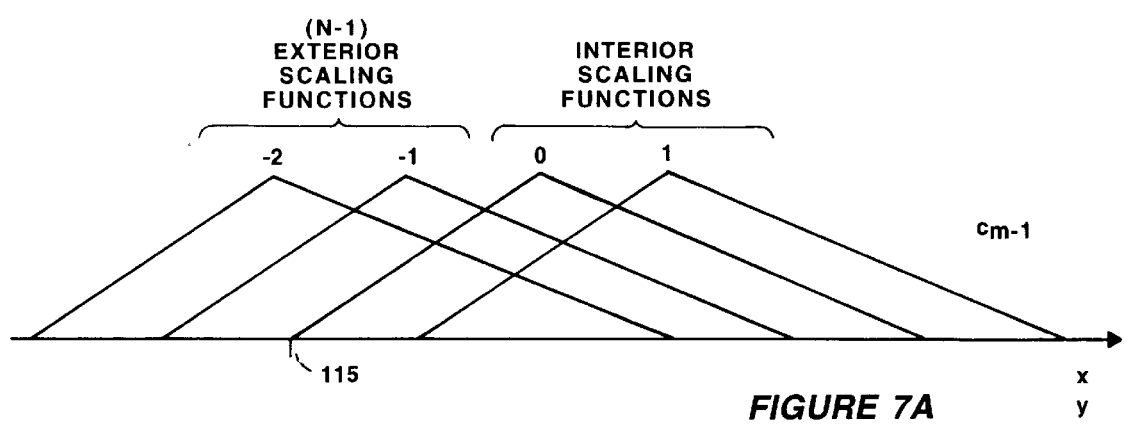
FIGS. 7C–7E are a series of figures illustrating extrapolated scaling and wavelet functions at a right hand boundary of an image to be transformed.
Figure 7B:
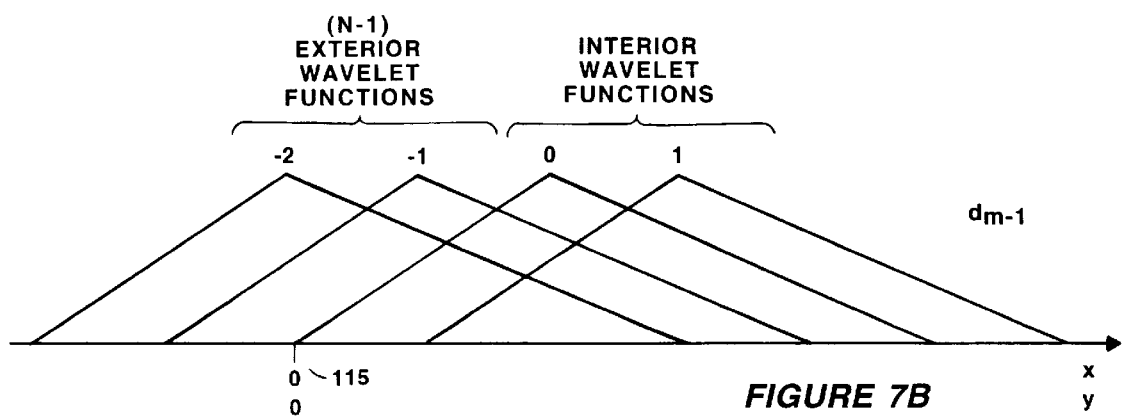

Referring now to FIGS. 7–7B, the extrapolation method is described below for the case of a one dimensional data set $c_m[n]$ having a length L. This may be expressed as:

$$c_m[n] \text{ where } n=0, 1, 2, \ldots L-1.$$

It should be noted that as used herein the notations $c_m[n]$ and $c_{m,n}$ are equivalent. Similarly, the same notation technique can be applied to the notations for $d_m[n]$, $a[n]$, $b[n]$, etc.

The extension of the method to a two dimensional data set (e.g. a pixel array) is performed by applying the method first to each row of the data, and then to each column of the data. For purposes of illustration, the method is first explained in conjunction with FIGS. 7–7B for the left hand boundary of the data (i.e. n=0) and the method is then explained in conjunction with FIGS. 7C–7E for the right hand boundary of the data (i.e. n=L–1).

FIG. 7 illustrates an original sequence of finite length L at a scale m. The finite length scale m sequence may be decomposed via an extrapolated discrete wavelet transform to obtain two finite length scale m–1 sequences which may be expressed as:

$$c_{m-1}[n] \text{ where } n=-N/2+1, -N/2+2, \ldots L/2-1$$

and $$d_{m-1}[n] \text{ where } n=-N/2+1, -N/2+2, \ldots L/2-1.$$

The sequence $c_{m-1}$ is generally referred to as a coarse resolution sequence while the sequence $d_{m-1}$ is generally referred to as a detail sequence.

The original finite length scale m sequence $c_m$ may be treated as the scaling function coefficients of a function $f(x)$ at scale m. The scale m scaling functions $\phi_{m,k}(x)=2^{m/2}\phi(2^m x-k)$ span a subspace, $V_m$, of the space of square integrable functions, $L^2(R)$. The projection of $f(x)$ onto $V_m$ may thus be expressed as:

$$P_m f(x) = \sum_k c_m[k]\phi_{m,k}(x) \qquad \text{Equation 5}$$

Using the transform $F(y)=f(x)$ in which $y=2^m x$ Equation 5 may be re-written as:

$$P_m F(y) = 2^{m/2}\sum_k c_m[k]\phi(y-k) \qquad \text{Equation 6}$$

It should be noted that, in general, the function $P_m F(y)$ will not be a polynomial. Rather, as will be explained in detail further below, the technique of the present invention assumes a best fit polynomial through this data expanded about predetermined points (i.e. boundary points).

It should also be noted that while the index k in Equations 5 and 6 implicitly range from negative to positive infinity, the coefficients $c_m[n]$ of interest are those corresponding to the original data as well as a sequence of values corresponding to the extrapolated values which will be generated as explained above in conjunction with FIGS. 6–6B (i.e. $n=-N+2, -N+3, \ldots, L+N-4, L+N-3$.

In FIG. 7, a filter having six coefficients is used (i.e. N=6). A plurality of interior scaling functions 114a–114d represent a sequence to the right of a left hand boundary point 115 at a scale m. Since in this particular example N=6, four exterior scaling functions 116a–116d at scale m are generated to the left of the boundary 115. Thus the exterior scaling functions at scale m may be expressed as:

$$\phi_{m,k}(x) \text{ for } k=-N+2, -N+3, \ldots, -1$$

It should be noted that for clarity, the scaling functions are pictorially represented as triangles.

FIG. 7A illustrates the scaling functions associated with the data at scale m−1 around the left hand boundary point 115 for the course resolution sequence $c_{m-1}$. The exterior scaling functions at scale m−1 may be expressed as:

$$\phi_{m-1,k}(x) \text{ for } k=-N/2+1, -N/2+2, \ldots, -1.$$

Similarly, FIG. 7B illustrates wavelet functions associated with the data at scale m−1 around the left hand boundary point 115 for the detail resolution sequence $d_{m-1}$. The exterior scaling functions at scale m−1 may be expressed as:
$\psi_{m-1,k}(x)$ for $k=-N/2+1, -N/2+2, \ldots, -1.$ Assume now, that $F(y)$ has a polynomial representation of order p−1 in the vicinity of the left boundary, y=0 and note that $$p = \frac{N}{2}$$

is the number vanishing moments. Performing a polynomial expansion about the left hand boundary point 115 at which y=0 provides:

$$P_m F(y) = 2^{m/2}\sum_k c_m[k]\phi(y-k) = \sum_{l=0}^{p-1}\lambda_l y^l \qquad \text{Equation 7}$$

in which:

$\lambda_l$ are constant coefficients of the polynomial.

Forming an inner product of equation (7) with the term $\phi(y-k)$, provides:

$$c_m[k] = 2^{-m/2}\sum_{l=0}^{p-1}\lambda_l \mu_k^l \qquad \text{Equation 8}$$

where $\mu_k^l$ are the moments of the scaling function:

$$\mu_k^l = <y^l, \phi(y-k)> \qquad \text{Equation 9}$$

The moments of the scaling function may be calculated from the following recursion:

$$\mu_0^0 = \int_{-\infty}^{\infty}\phi(y)dy = 1 \qquad \text{Equation 10}$$

$$\mu_0^l = \frac{1}{2(2^l-1)}\sum_{i=0}^{l-1}\binom{l}{i}\left(\sum_{k=0}^{N-1}a[k]k^{l-i}\right)\mu_0^i \qquad \text{Equation 11}$$

$$\mu_k^l = \sum_{i=0}^{l}\binom{l}{i}k^{l-i}c_0^i \qquad \text{Equation 12}$$

Equation 8 may now be used to determine the polynomial coefficients, $\lambda_l$, from the given sequence. Letting M represent the number of sequence values to be used in determining these coefficients yields a linear system of the form:

$$2^{-m/2}\begin{bmatrix} \mu_0^0 & \mu_0^1 & \cdots & \mu_0^{p-1} \\ \mu_1^0 & \mu_1^1 & \cdots & \mu_1^{p-1} \\ \vdots & \vdots & & \vdots \\ \mu_{M-1}^0 & \mu_{M-1}^1 & \cdots & \mu_{M-1}^{p-1} \end{bmatrix}\begin{bmatrix}\lambda_0 \\ \lambda_1 \\ \vdots \\ \lambda_{p-1}\end{bmatrix} = \begin{bmatrix}c_m[0] \\ c_m[1] \\ \vdots \\ c_m[M-1]\end{bmatrix} \qquad \text{Equation 13}$$

It should be noted that M must be greater than or equal to p in order to determine $\lambda_l$. There is some flexibility, however, in the exact choice of the parameter M and this will be addressed subsequently. For M>p, it is necessary to first form the normal equations, which take the form $$2^{-m/2}A^T A x = A^T b \qquad \text{Equation 14}$$

The normal equations yield a least squares solution of the form $$x = 2^{m/2}(A^T A)^{-1}A^T b \qquad \text{Equation 15}$$

Let $\xi_{l,i}$ denote the elements of the pxM matrix $(A^T A)^{-1}A^T$. Then one can obtain the following expression for the polynomial coefficients:

$$\lambda_l = 2^{m/2}\sum_{i=0}^{M-1}\xi_{l,i}c_m[i] \qquad \text{Equation 16}$$

for $l = 0, 1, \ldots, p-1$

The given sequence may now be extrapolated at the left boundary 115 by substituting Equation 16 into Equation 8. Then the coefficients of the scale m exterior scaling functions may be computed as $$c_m[k] = \sum_{i=0}^{M-1} v_{k,i} c_m[i] \qquad \text{Equation 17}$$

for $k = -N + 2, -N + 3, \ldots, -1$ where $$v_{k,i} = \sum_{l=0}^{p-1} \xi_{l,i} u_k^l \qquad \text{Equation 18}$$

for $k = -N + 2, -N + 3, \ldots, -1$ $i = 0, 1, \ldots, M - 1$

Now consider the multiresolution decomposition equations $$c_{m-1}[n] = \frac{1}{\sqrt{2}} \sum_{k=2n}^{2n+N-1} c_m[k] a[k - 2n]$$

$$d_{m-1}[n] = \frac{1}{\sqrt{2}} \sum_{k=2n}^{2n+N-1} c_m[k] b[k - 2n]$$

in which:

c[m] corresponds to a set of data samples (e.g. one row or column of a pixel array);

a[k] correspond to the filter coefficients associated with Daubechies N coefficient scaling function;

b[k] correspond to the filter coefficients associated with corresponding wavelet; and m corresponds to the scale or resolution of the data.

For an exterior scaling function at scale m−1, the multiresolution decomposition equation for the sequence $c_{m-1}[n]$ can be split into two parts:

$$c_{m-1}[n] = \frac{1}{\sqrt{2}} \sum_{k=2n}^{-1} c_{m-1}[k] a[k - 2n] + \qquad \text{Equation 19}$$

$$\frac{1}{\sqrt{2}} \sum_{k=0}^{2n+N-1} c_m[k] a[k - 2n]$$

for $n = -N/2 + 1, -N/2 + 2, \ldots -1$

The first sum only involves the exterior scaling functions at scale m. Substituting Equation 17 into the first sum, one obtains the following multiresolution decomposition for the exterior scaling functions at scale m−1:

$$c_{m-1}[n] = \frac{1}{\sqrt{2}} \sum_{k=0}^{2n+N-1} c_m[k] a[k - 2n] + \frac{1}{\sqrt{2}} \sum_{k=0}^{M-1} c_m[k] \Theta_{2n,k} \qquad \text{Equation 20}$$

for $n = -N/2 + 1, -N/2 + 2, \ldots -1$ where $$\Theta_{l,i} = \sum_{k=1}^{-1} v_{k,i} a[k - l] \qquad \text{Equation 21}$$

for $l = -N + 2, -N + 4, \ldots, -2$ and $i = 0, 1, \ldots, M - 1$

Equation 20 represents the required modification to the multiresolution decomposition equation for the sequence $c_{m-1}[n]$ at the left boundary.

Similarly, the multiresolution decomposition equation for the sequence $d_{m-1}[n]$ can be split into two parts leading to the required modification for this sequence at the left boundary:

$$d_{m-1}[n] = \frac{1}{\sqrt{2}} \sum_{k=0}^{2n+N-1} c_m[k] b[k - 2n] + \frac{1}{\sqrt{2}} \sum_{k=0}^{M-1} c_m[k] \Delta_{2n,k} \qquad \text{Equation 22}$$

for $n = -N/2 + 1, -N/2 + 2, \ldots -1$ in which:

$$\Delta_{l,i} = \sum_{K=1}^{-1} v_{k,i} b[k - l] \qquad \text{Equation 23}$$

for $l = -N + 2, -N + 4, \ldots, -2$ and $i = 0, \ldots, M - 1$

Figure 8C:
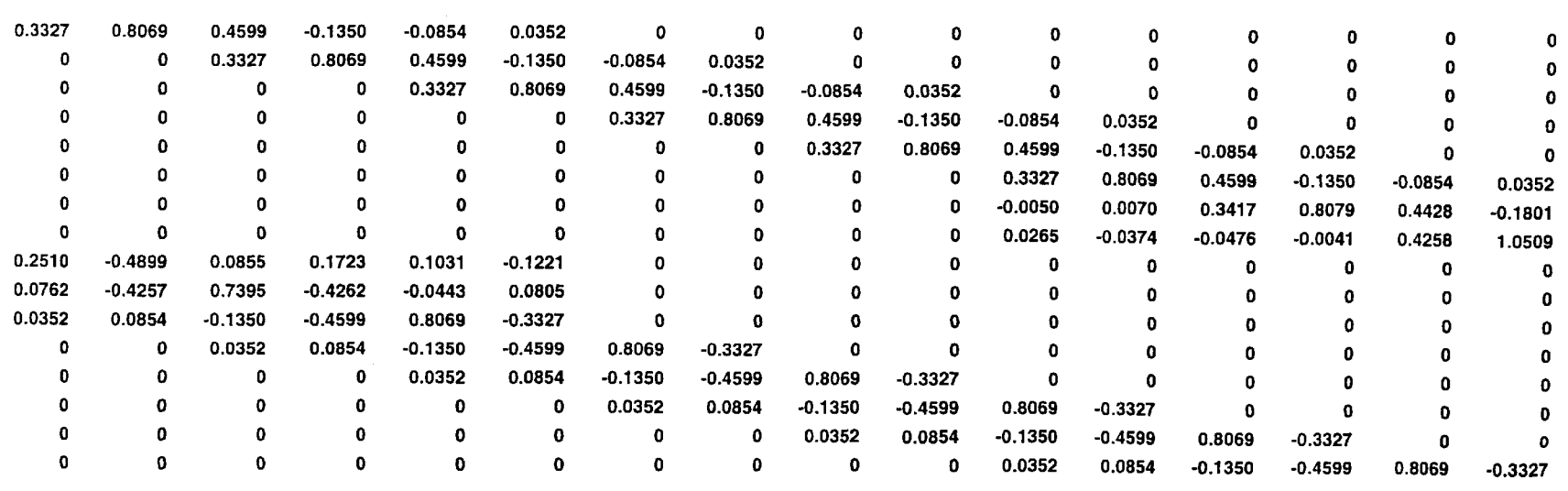

It should be noted, and as may be clearly seen in FIG. 8C, the modifying coefficients $\theta_{1,i}$ and $\Delta_{1,i}$ appear as localized blocks of size (N/2−1)×M in the extrapolated discrete wavelet transform matrix.

As will be described below, similar expressions exist for the wavelet transform at the right boundary. Elsewhere, the standard wavelet transform expressions apply.

It should be noted that Equation 17 need not be combined with the wavelet transform. For applications other than image processing, it may be desirable to combine Equation 17 with other filters. For example, in a numerical simulation, a numerical derivative filter would be used.

Extrapolation at a Right Boundary of an Image

Figure 7C:
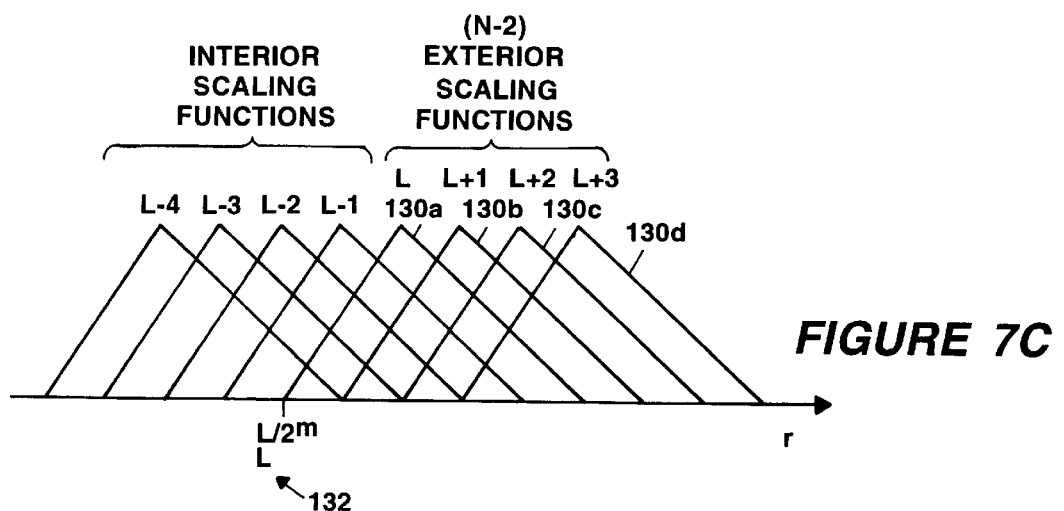
Figure 7D:
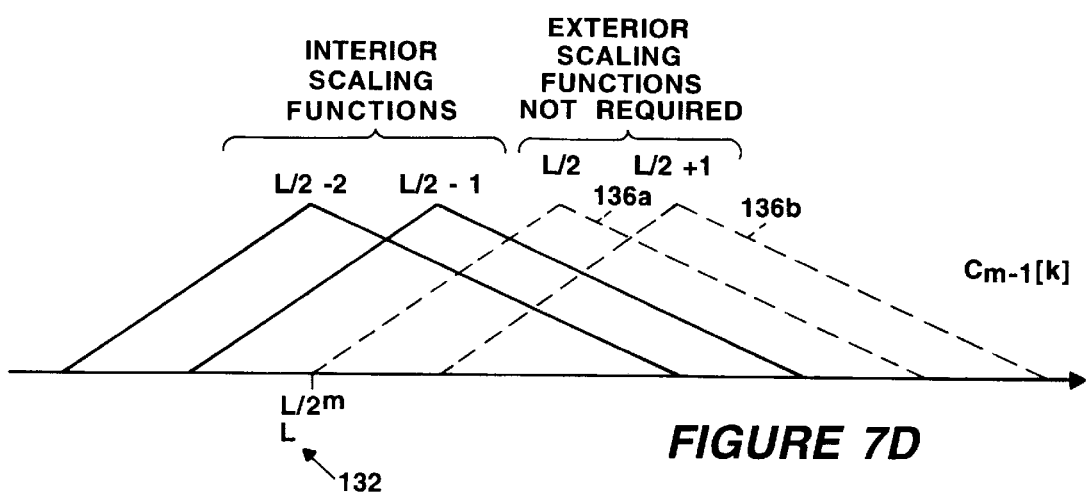
Figure 7E:
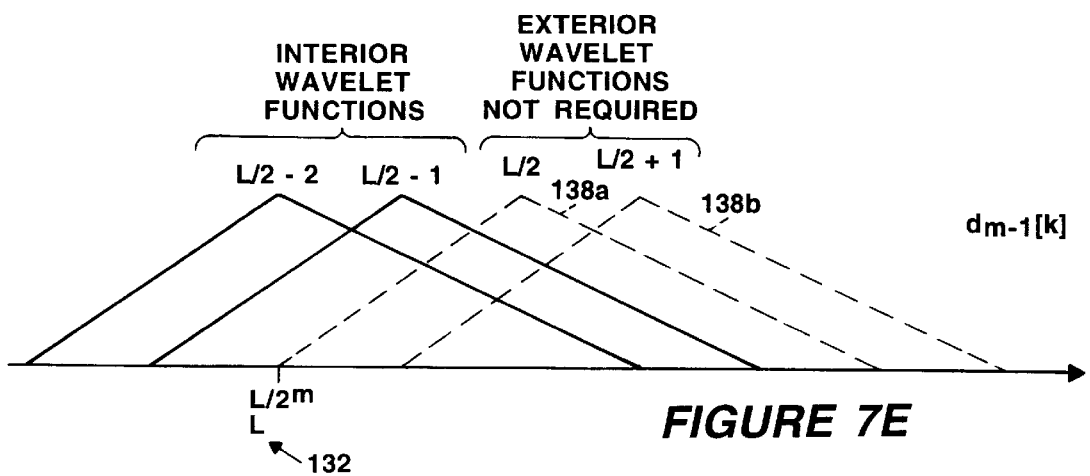

Referring now to FIGS. 7C–7E, the extrapolation process at a right hand boundary of a data sequence will now be explained. The extrapolation process at the right boundary is similar in principle to that at the left boundary. However, there are a few differences, which arise mainly due to the asymmetry of the Daubechies filter coefficients and scaling functions.

As explained above in conjunction with FIGS. 6–6B, the purpose of extrapolation at the right boundary is to eliminate edge effects in the forward discrete wavelet transform.

As above, let the data, $c_m[n]$, represent a subset, n=0,1,2, . . . , L−1, of the scaling function coefficients of some function $P_m F(y)$. This may be expressed as:

$$P_m F(y) = 2^{m/2} \sum_k c_m[k] \phi(y - k)$$

As above, the function $P_m F(y)$ will generally not be a polynomial. In a preferred embodiment of the method, a best fit polynomial is assumed through this data, expanded about the point y=L.

FIG. 7C illustrates the scale m scaling functions 130a–130d which may be expressed as, $\phi_{m,k}(x)$ for k=L, L+1, . . . , L+N−3 and which are associated with the sequence values to be extrapolated at a right boundary 132, for the case N=6. Since scaling functions 130a–130d exist past the right hand boundary, scaling functions 130a–130d correspond to exterior scaling functions. Since the goal is to obtain the sequences $c_{m-1}[n]$ and $d_{m-1}[n]$ for n=−N/2+1, −N/2+2, . . . , L/2−1, the exterior scaling functions 136a, 136b and wavelet 138a, 138b at the right boundary at scale m−1 are not required.

Considering a (p−1)th order polynomial expansion of F(y) around the point y=L, provides:

$$P_m F(y) = 2^{m/2} \sum_k c_m[k] \phi(y - k) = \sum_{l=0}^{p-1} \lambda_l (y - L)^l \qquad \text{Equation 24}$$

in which:

p=N/2=Number of vanishing moments; and
$\lambda_1$ are the coefficients of the best fit polynomial.
This leads to the expression $$c_m[k] = 2^{-m/2} \sum_{l=0}^{p-1} \lambda_l \mu_{k-L}^l \quad \text{Equation 25}$$

In Equation 25 the last M sequence values (M≥p) may be written out and expressed in matrix form as:

$$2^{-m/2} \begin{bmatrix} \mu_{-M}^0 & \mu_{-M}^1 & \cdots & \mu_{-M}^{p-1} \\ \mu_{-M+1}^0 & \mu_{-M+1}^1 & \cdots & \mu_{-M+1}^{p-1} \\ \cdot & \cdot & & \cdot \\ \cdot & \cdot & & \cdot \\ \cdot & \cdot & & \cdot \\ \mu_{-1}^0 & \mu_{-1}^1 & \cdots & \mu_{-1}^{p-1} \end{bmatrix} \begin{bmatrix} \lambda_0 \\ \lambda_1 \\ \cdot \\ \cdot \\ \cdot \\ \lambda_{p-1} \end{bmatrix} = \begin{bmatrix} c_m[L-M] \\ c_m[L-M+1] \\ \cdot \\ \cdot \\ \cdot \\ c_m[L-1] \end{bmatrix} \quad \text{Equation 26}$$

The parameter M is designated the extrapolation parameter and it represents the number of known data coefficients used to determine the polynomial coefficients. The minimum required value for the extrapolation parameter M is M=p. Larger values of the extrapolation parameter M, however, may be required in some cases.

In the case M>p, the polynomial coefficients are determined by a least squares approach. Letting A denote the matrix on the left hand side of Equation 26, and letting $\xi_{l,i}$ denote the elements of the p×M matrix $(A^T A)^{-1} A^T$ allows the polynomial coefficients to be expressed in terms of known data coefficients as shown in Equation 27.

$$\lambda_l = 2^{m/2} \sum_{i=0}^{M-1} \xi_{l,i} c_m[L - M + i] \quad \text{Equation 27}$$

for $l = 0, 1, \ldots, p - 1$

Having determined the polynomial coefficients, one may extrapolate the given sequence to obtain the coefficients of the scale m exterior scaling functions at the right boundary:

$$c_m[k] = \sum_{i=0}^{M-1} \nu_{k-L,i} c_m[L - M + i] \quad \text{Equation 28}$$

for $k = L, L + 1, \ldots, L + N - 3$ where $$\nu_{k,i} = \sum_{l=0}^{p-1} \xi_{l,i} \mu_k^l \quad \text{Equation 29}$$

for k=0, 1, ..., N-3
and i=0, 1, ..., M-1

Combining Equation 28 with the wavelet transform equations $$c_{m-1}[n] = \frac{1}{\sqrt{2}} \sum_{k=2n}^{2n+N-1} c_m[k] a[k - 2n]$$

-continued $$d_{m-1}[n] = \frac{1}{\sqrt{2}} \sum_{k=2n}^{2n+N-1} c_m[k] b[k - 2n]$$

in which:

c[m] corresponds to a set of data samples (e.g. one row or column of a pixel array);

a[k] correspond to the filter coefficients associated with Daubechies N coefficient scaling function;

b[k] correspond to the filter coefficients associated with corresponding wavelet;

m corresponds to the scale or resolution of the data leads to the following modified expressions for the wavelet transform at the right boundary.

$$c_{m-1}[n] = \frac{1}{\sqrt{2}} \sum_{k=2n}^{L-1} c_m[k] a[k - 2n] + \frac{1}{\sqrt{2}} \sum_{k=L-M}^{L-1} c_m[k] \Theta_{2n-L, k-L+M} \quad \text{Equation 30}$$

for $n = L/2 - N/2 + 1, L/2 - N/2 + 2, \ldots, L/2 - 1$ where $$\Theta_{l,i} = \sum_{k=0}^{l+N-1} \nu_{k,i} a[k - l] \quad \text{Equation 31}$$

for $l = -N + 2, -N + 4, \ldots -2$ and $i = 0, 1, \ldots, M - 1$ and $$d_{m-1}[n] = \frac{1}{\sqrt{2}} \sum_{k=2n}^{L-1} c_m[k] b[k - 2n] + \frac{1}{\sqrt{2}} \sum_{k=L-M}^{L-1} c_m[k] \Delta_{2n-L, k-L+M} \quad \text{Equation 32}$$

for $n = L/2 - N/2 + 1, L/2 - N/2 + 2, \ldots L/2 - 1$ where $$\Delta_{l,i} = \sum_{k=0}^{l+N-1} \nu_{k,i} b[k - l] \quad \text{Equation 33}$$

for $1 = -N + 2, -N + 4, \ldots -2$ and $i = 0, 1, \ldots, M - 1$

Equations 30 and 31 are valid for the scale m−1 scaling function coefficients $c_{m-1}[n]$ and the scale m−1 wavelet coefficients $d_{m-1}[n]$ with indices n=L/2−N/2+1, L/2−N/2+2, ..., L/2−1.

As described above, similar expressions exist for the wavelet transform at the left boundary. Elsewhere, the standard wavelet transform expressions apply.

It should be noted that Equation 28 need not be combined with the wavelet transform. For applications other than image processing, it may be desirable to combine Equation 28 with other filters. For example, in a numerical simulation, a numerical derivative filter would be used.

Choice of the Extrapolation parameter

The extrapolated discrete wavelet transform described above takes a sequence of length L at scale m and transforms it into two sequences at scale m−1 whose total length is L+N−2. The scale m−1 sequences contain all the information that is required to reconstruct the original scale m sequence using the standard inverse discrete wavelet transform, provided that the extrapolation parameter, M, is sufficiently large.

For example the smallest value of the extrapolation parameter required to solve Equations 13 and 26 is M=p, where p is the number of vanishing moments. This might seem like an appropriate choice because the polynomial coefficients $\lambda_1$ will be based on an "exact" solution to Equations 13 and 26, as opposed to a least squares solution. However, when the discrete wavelet transform matrix is constructed using this choice of extrapolation parameter, one finds that it is rank deficient i.e. it does not have L linearly independent rows. This means that one could never find an inverse transform which would perfectly reconstruct the original sequence.

Numerical experiments indicate that a suitable choice for the extrapolation parameter is M=N. With this choice one is always able to obtain perfect reconstruction. Of course, it is possible to use larger values of M, e.g. to smooth out random variation in the data, but this will limit the size of the smallest transform that can be performed with a given filter length, N. In general, however, the choice M=N is recommended.

Referring now to FIGS. 8–8B, a method of selecting a predetermined number of data points from a data sequence corresponding to a transformed image and which includes exterior pixel values includes the steps of selecting a predetermined number of data points in a low pass data sequence at a first scale wherein the data sequence lies within first and second boundaries defined by a sequence of data representing an image and selecting a predetermined number of data points in a high pass data sequence wherein at least one of the selected data points corresponds to an external pixel and wherein the total number of data points selected does not exceed the total number of data points in the original data sequence. It should be noted that these steps may be performed in a data selection and sequencer module such as that described above in conjunction with FIG. 2.

The selected data points should be independent to thus allow reconstruction of the original data sequence using the transform which is the inverse of the transform used to decompose the original image into the high pass and low pass data sequences.

In FIG. 8A, the data sequences $D'_0$ to $D'_7$ generally denoted 164 and in FIG. 8B $D''_{-2}$ to $D''_5$ generally denoted 166 are those that were stored in step 110 described above in conjunction with FIG. 5. Also this is the data sequence which would be received in step 114 described above in conjunction with FIG. 5A. Thus during the recover data step 118 (FIG. 5A), the data points $D'_{-2}$, $D'_{-1}$ and then the data points $D''_6$ and $D''_7$ would be computed. In a preferred embodiment data points $D'_{-2}$, $D'_{-1}$ are first computed and then data points $D''_6$ $D''_7$ are computed.

One method of selecting non-redundant data points and recovering the unstored data values, $D'_{-2}$, $D'_{-1}$, $D''_6$ and $D''_7$ is described below.

Elimination of Redundance in the Extrapolated Discrete Wavelet Transform

As explained above in conjunction with FIG. 6, with a suitable choice for the extrapolation parameter there will be a total of L independent sequence values at scale m−1, out of a total of L+N−2 samples. Consequently there are N−2 samples of redundant data.

Apart from the obvious inefficiency of storing redundant samples, there is the added drawback that a given sequence $c_m[n]$ whose length, L, is a power of 2, will be transformed into sequences whose lengths are not a power of 2. That is, the sequences $c_{m-1}[n]$ and $d_{m-1}[n]$ may not necessarily include an even number of data points. This means that the extrapolated discrete wavelet transform, in its present form, cannot be recursively applied to the sequences $c_m[n]$, $c_{m-1}[n]$, $c_{m-2}[n]$, . . . , as is usually done in multiresolution decompositions.

In order to eliminate redundancy and in order to obtain a full radix-2 multiscale transform, therefore, L independent samples must be selected to be stored at scale m−1. It should be noted that this also requires providing a method of reconstructing the remaining N−2 samples which are not stored.

Clearly, there is more than one possible choice, and some choices are better than others. Each choice will provide a different L×L discrete wavelet transform matrix. In selecting the L independent samples a number of criteria should be considered.

First, one-half of the samples (L/2) should preferably be selected from the sequence $c_{m-1}[n]$ and the other half should be selected the sequence $d_{m-1}[n]$. Also, it is preferable to select a contiguous sets of samples from each sequence.

Second the L samples must be linearly independent and third, the condition number of the resulting discrete wavelet transform (DWT) matrix indicating the invertibility of the discrete wavelet transform should be relatively small.

Based on the above criteria, the low pass data sequence which is stored should correspond to $c_{m-1}[n]$ for n=0, 1, 2, . . . , (L/2)−1. In this particular example, this sequence corresponds to sequence 164. It should be noted that each of the selected data values are inside the boundaries 149, 150.

Similarly, the high pass data sequence which is stored should correspond to $d_{m-1}[n]$; n=−N/2+1, −N/2+2, . . . , L/2−N/2 which in this particular example corresponds to sequence 166. It should be noted that here, two of the selected data values are outside the boundary 149.

The entries in the resulting 16×16 extrapolated DWT matrix for N=6 are shown in FIG. 8C. With such a choice the matrix is provided having a relatively low condition number thus indicating that the matrix is invertible.

Recovery of Data Points

As described above the data values $c_{m-1,k}$ for k=0, 1 . . . L/2−1 and $d_{m-1,k}$ for k=k−N/2+1, −N/2+2, . . . , L/2−N/2 are stored To apply the inverse discrete wavelet transform (IDWT) one must first reconstruct the values which were not stored namely $c_{m-1,k}$ for k=−N/2+1, −N/2+2, . . . −1 and $d_{m-1,k}$ for k=L/2−N/2+1, L/2−N/2+2, . . . L/2−1.

Considering first the left hand boundary, to recover the N−2 samples which are not stored but which are required to exactly reconstruct the original data sequence, two sets of linear equations are developed which are expressed below in matrix form:

$$\begin{bmatrix} c_{m-1,-N/2+1} \\ c_{m-1,-N/2+2} \\ \vdots \\ \vdots \\ c_{m-1,-1} \end{bmatrix} = \frac{1}{\sqrt{2}} \begin{bmatrix} a_{N-2}+\theta_{-N+2,0} & a_{N-1}+\theta_{-N+2,1} & \theta_{-N+2,2} & \cdots & \theta_{-N+2,M-1} \\ a_{N-4}+\theta_{-N+4,0} & a_{N-3}+\theta_{-N+4,1} & a_{N-2}+\theta_{-N+4,2} & \cdots & \theta_{-N+4,M-1} \\ \vdots & \vdots & \vdots & & \vdots \\ \vdots & \vdots & \vdots & & \vdots \\ a_2+\theta_{-2,0} & a_3+\theta_{-2,1} & a_4+\theta_{-2,2} & \cdots & \theta_{-2,M-1} \end{bmatrix} \begin{bmatrix} c_{m,0} \\ c_{m,-1} \\ \vdots \\ \vdots \\ c_{m,M-1} \end{bmatrix}$$

Equation 34 in which the matrix on the left hand side of the equal sign is of order $(N/2-1)\times 1$ and corresponds to the values of the data points which are not stored and the first matrix on the right hand side of the equal sign contains modified filter coefficients where the values $\theta$ correspond to the modification terms which modify the conventional filter coefficients $a_k$.

The second set of matrix equations may similarly be expressed as:

$$\begin{bmatrix} c_{m,0} \\ c_{m,1} \\ \vdots \\ \vdots \\ c_{m,M-1} \end{bmatrix} = \frac{1}{\sqrt{2}} \begin{bmatrix} a_{N-2}a_{N-4}\ldots a_0 & & & & b_{N-2}b_{N-4}\ldots b_0 & & & \\ a_{N-1}a_{N-3}\ldots a_1 & & & & b_{N-1}b_{N-3}\ldots b_1 & & & \\ & a_{N-2}\ldots a_2 a_0 & & & & b_{N-2}\ldots b_2 b_0 & & \\ & a_{N-1}\ldots a_3 a_1 & & & & b_{N-1}\ldots b_3 b_1 & & \\ (M_{2-1}\text{zeros}) & & & & & & & \\ & & & a_{N-2}\ldots a_2 a_0 & & & & b_{N-2}\ldots b_2 b_0 \\ & & & a_{N-1}\ldots a_3 a_1 & & & & b_{N-1}\ldots b_3 b_1 \end{bmatrix} \begin{bmatrix} c_{M-1,-\frac{N}{2}+1} \\ c_{N-1,-\frac{N}{2}+2} \\ \vdots \\ c_{m-1,\frac{M}{2}-1} \\ d_{m-1,-\frac{N}{2}+1} \\ d_{m-1,-\frac{N}{2}+2} \\ \vdots \\ d_{m-1,\frac{M}{2}-1} \end{bmatrix}$$

Equation 35

Thus, matrix Equations 34 and 35 may be solved using well known techniques to reconstruct the values which were not stored from the values which were stored. It should be noted that Equations 34 and 35 have been derived to basis functions which are orthogonal, but it is recognized of course that the same techniques can be applied to other basis functions such as biorthogonal basis functions. These matrix equations may be expressed in shorthand notation as:

$$c^e_{m-1} = Tc_m$$

where:

$$c_m = [A^e A^i \vdots B^e B^i] \begin{bmatrix} c^e_{m-1} \\ c^i_{m-1} \\ d^e_{m-1} \\ d^i_{m-1} \end{bmatrix}$$

In which:

$c^e_{m-1}$ corresponds to a vector of the extrapolated data samples;

T corresponds to that portion of the decomposition matrix needed to solve for the external pixel values as shown in Equation 34;

$A^e$ corresponds to a $M\times(N/2)-1$ portion of the matrix in Equation 35;

$A^i$ corresponds to a $M\times M/2$ portion of the matrix in Equation 35;

$B^e$ corresponds to a $M\times(N/2)-1$ portion of the matrix in Equation 35; and $B^i$ corresponds to a $M\times M/2$ portion of the matrix in Equation 35.

It should be noted that the superscript "e" denotes exterior (extrapolated) data samples i.e. $k=-N/2+1, -N/2+2, \ldots, -1$, and the superscript "i" denotes interior samples i.e. $k=0, 1, \ldots, (M/2)-1$ Thus, providing:

$$c_{m-1}^e = T(A^e c_{m-1}^e + A^i c_{m-1}^i + B^e d_{m-1}^e + B^i d_{m-1}^i)$$

or $$c_{m-1}^e = (I-TA^e)^{-1} T(A^i c_{m-1}^i + B^e d_{m-1}^e + B^i d_{m-1}^i)$$

For the right hand boundary, a similar process leads to $$d_{m-1}^e = Tc_m$$

$$c_m = [A^i A^e \vdots B^i B^e] \begin{bmatrix} c^i_{m-1} \\ c^e_{m-1} \\ d^i_{m-1} \\ d^e_{m-1} \end{bmatrix}$$

$$d_{m-1}^e = (I-TB^e)^{-1} T(A^i c_{m-1}^i + A^e c_{m-1}^e + B^i d_{m-1}^i)$$

The above matrix equations may be solved using techniques well known to those or ordinary skill in the art.

Referring now to FIGS. 9–9C, an image 170 has been divided via a region selector similar to region selector 16 described above in conjunction with FIG. 1, into four blocks 170a, 170b, 170c, 170d denoted A, B, C, D respectively.

Each of the regions A, B, C, D may be fed through row and column analyzers to generate a plurality of sub-band images 172, 174, 176, 178. Each of the sub-band images has an average image component (i.e. a low pass filtered sequence) 172a, 174a, 176a, 178a and a plurality of detail image components (i.e. high pass filtered sequences) 172b–172d, 174b–174d, 176b–176d, 178b–178d. Here sub-band images 172–178 have been generated via a single stage decomposition. Thus, as shown in FIG. 9B after a single stage of decomposition, four sub-band images exist for each of the regions A, B, C, D each of the sub-band images including an average block and three detail blocks. It should be appreciated, however, that multiple stage decompositions could be applied to each of the image blocks 170a–170d.

During a reconstruction operation, portions of each analyzer sub-band image, here corresponding to the average sub-band images 172a, 174a, 176a, 178a may be selected and fed to a region combiner which combines the sub-band images 172a, 174a, 176a, 178a into a composite image 180 as shown in FIG. 9C.

In the present example, since each of the image regions A, B, C, D have been transformed in accordance with the extrapolation and reconstruction techniques of the present invention described hereinabove, each of the average sub-band images may be combined to arrive at a composite image 180 which is free of edge effects.

It should also be noted that in some embodiments it may be desirable to combine detail images rather than the average images. For example, sub-band images $A_{HH}$, $B_{HH}$, $C_{HH}$ and $D_{HH}$ may be combined to provide a composite image of the detail portions 172d, 174d, 176d 178d of image blocks A, B, C and D.

Figure 10:
FIG. 10 is a screen print of a composite image generated in accordance with the present invention.

FIG. 10 is a composite image 190 which has been decomposed and re-constructed using the boundary extrapolation techniques described hereinabove. The composite image 190 is provided by joining of four average sub-band images generated using a two stage decomposition. The original image was thus divided into four image blocks each of which was subject to a two stage wavelet decomposition using a D6 filter. Thus, by using the boundary extrapolation technique of the present invention when decomposing the original image, no edge effects result during a reconstruction process to provide the composite image 190.

Figure 11:
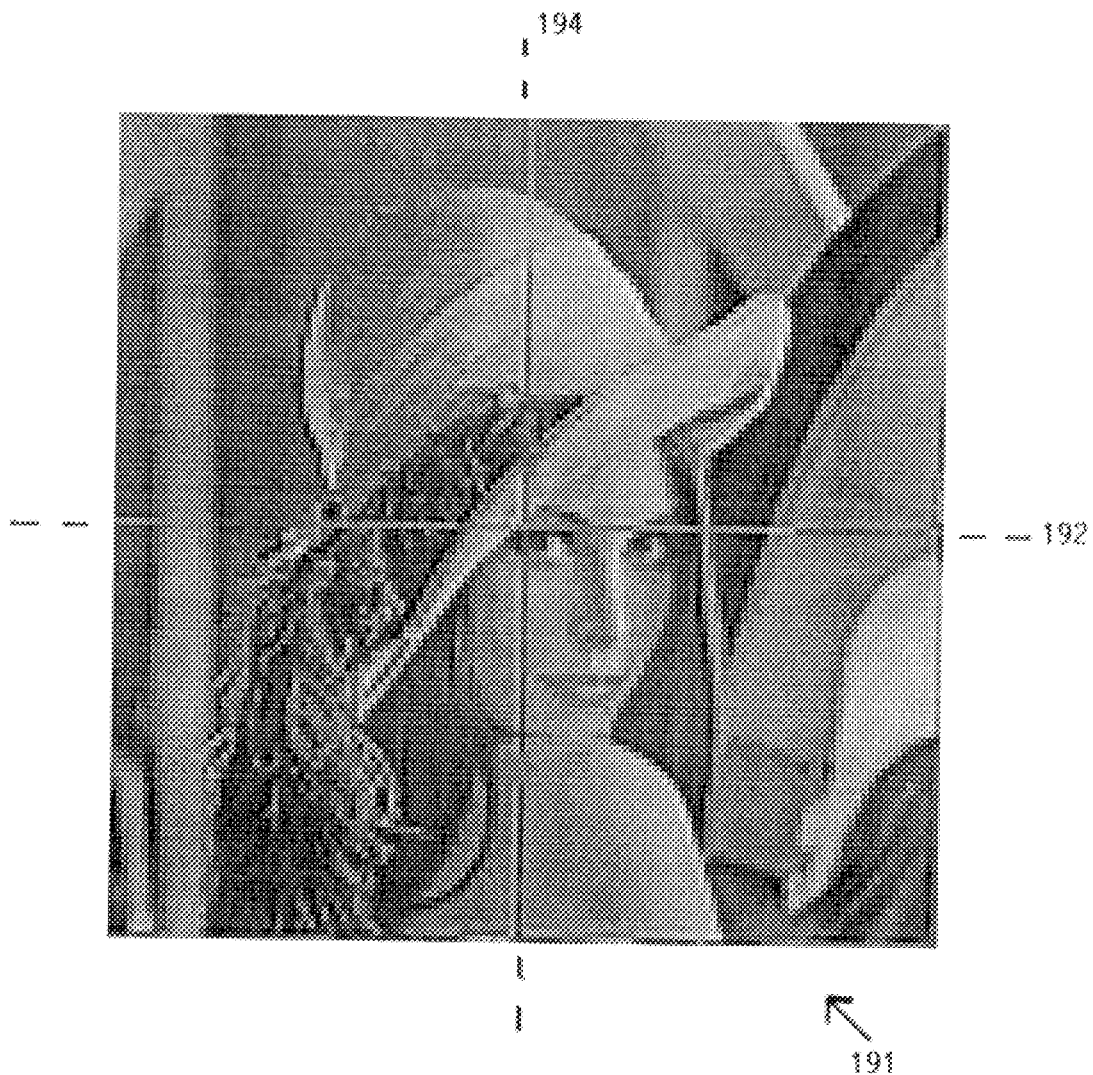
FIG. 11 is a screen print of a composite image generated using a prior art technique.

In contrast and referring briefly to FIG. 11, a composite image 191 which has been transformed using conventional prior art techniques such as circular convolution or reflection techniques illustrates that edge effects are clearly present along horizontal and vertical center lines 192, 194 of the composite image 191 where the sub-band images have been joined to provide the composite image 191.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

We claim:

1. A method of eliminating edge effects from a transformed image, the method comprising the steps of:

(a) selecting a wavelet basis function which approximates a sequence of data values wherein the sequence of data values define an image region and wherein a first data value in the sequence of data values corresponds to a first boundary of the image and a second data value in the sequence of data values corresponds to a second boundary of the image;

(b) selecting a first predetermined number of data values inside the predetermined boundary region of the image region;

(c) generating a polynomial having a predetermined order and having a predetermined characteristic inside a predetermined boundary region of the image region wherein the polynomial is representative of selected data values inside the boundary region, wherein the first predetermined number of data values correspond to at least twice the predetermined order of the polynomial;

(d) extrapolating the polynomial a predetermined length outside the boundary region;

(e) generating a second predetermined number of exterior data values from the portion of the polynomial extrapolated outside the boundary region of the image region; and (f) expressing the plurality of exterior data values in terms of data values inside the boundary region of the image region.

2. The method of claim 1 wherein the basis function is a wavelet basis function.

3. The method of claim 2 wherein said wavelet basis function is a Daubechies orthogonal compactly supported wavelet.

4. The method of claim 3 wherein the first and second number of data values are a like number of data values.

5. A method comprising the steps of:

(a) selecting a basis function which approximates a sequence of data values representing an image wherein a first data value in the sequence of data values corresponds to a first image boundary of the sequence of data values and a second data value in the sequence of data values corresponds to a second image boundary of the sequence of data values;

(b) selecting a first predetermined number of data values representing an image along a polynomial, the polynomial having a predetermined order inside a predetermined boundary region wherein the first predetermined number of data values correspond to at least twice the predetermined order of the polynomial;

(c) extrapolating the polynomial a predetermined length outside the predetermined boundary region;

(d) generating a plurality of exterior data values representative of the polynomial outside the predetermined boundary region; and (e) expressing the plurality of exterior data values in terms of the data values represented by the polynomial inside the predetermined boundary region.

6. The method of claim 5 wherein the basis functions are wavelet basis functions.

7. The method of claim 6 wherein said wavelet basis functions are Daubechies orthogonal compactly supported wavelets.

8. The method of claim 7 wherein the first and second number of data values are a like number of data values.

* * * * *